(12) United States Patent
Pohl et al.

(10) Patent No.: US 12,308,636 B2
(45) Date of Patent: May 20, 2025

(54) SYSTEM AND FIELD DEVICE

(71) Applicant: Beckhoff Automation GmbH, Verl (DE)

(72) Inventors: Christopher Pohl, Verl (DE); Thomas Rettig, Rheda-Wiedenbrück (DE); Sebastian Petrović, Bünde (DE); Benjamin Bruns, Celle (DE)

(73) Assignee: Beckhoff Automation GmbH, Verl (DE)

( * ) Notice: Subject to any disclaimer, the term of this patent is extended or adjusted under 35 U.S.C. 154(b) by 161 days.

(21) Appl. No.: 18/347,296

(22) Filed: Jul. 5, 2023

(65) Prior Publication Data

US 2023/0352931 A1   Nov. 2, 2023

Related U.S. Application Data

(63) Continuation of application No. PCT/EP2021/082655, filed on Nov. 23, 2021.

(30) Foreign Application Priority Data

Feb. 2, 2021 (DE) .................. 10 2021 102 357.2

(51) Int. Cl.
*H02H 9/00* (2006.01)
*H02H 1/00* (2006.01)

(52) U.S. Cl.
CPC .......... *H02H 9/008* (2013.01); *H02H 1/0015* (2013.01)

(58) Field of Classification Search
CPC .............................. H02H 9/008; H02H 1/0015
See application file for complete search history.

(56) References Cited

U.S. PATENT DOCUMENTS 6,397,322 B1   5/2002 Voss
6,751,076 B2   6/2004 Lytollis
(Continued)

FOREIGN PATENT DOCUMENTS

CN   101257428 A   9/2008
DE   10220708 A1   11/2003
(Continued)

OTHER PUBLICATIONS

"Explosive atmospheres," BSI Standards Publication, British Standards Institution, PD IEC/TS 60079-39:2015.
(Continued)

*Primary Examiner* — Scott Bauer
(74) *Attorney, Agent, or Firm* — Dorsey & Whitney LLP

(57) ABSTRACT

A system includes a plurality of field devices electrically connected to a feed-in device configured to supply electrical energy. The feed-in device has a monitoring device to detect spark generation in the electrical energy supply, and, based on this, to switch off the supply. The field devices have a first section with an input terminal for connecting a supply line, and a second section. The electrical energy provided by the feed-in device can be supplied to the first section via the input terminal, and transmitted from the first section to the second section via an electrical energy supply connection. The second section has a terminal device with at least one output line terminal for connecting at least one output line to forward the electrical energy. The electrical energy supply connection has a power limiting device to limit the electrical power transmittable from the first section to the second section.

20 Claims, 14 Drawing Sheets

(56) References Cited

U.S. PATENT DOCUMENTS

| | | | |
|---|---|---|---|
| 7,463,470 B2 | 12/2008 | Lark | |
| 7,561,392 B2 | 7/2009 | Becker et al. | |
| 7,835,295 B2* | 11/2010 | Brewer | H04L 12/10 |
| | | | 370/252 |
| 7,876,544 B2 | 1/2011 | Kessler et al. | |
| 8,242,901 B2 | 8/2012 | Indefrey et al. | |
| 9,742,269 B2 | 8/2017 | Seifried | |
| 10,333,640 B2 | 6/2019 | Pohl et al. | |
| 10,396,854 B2 | 8/2019 | Cherewka et al. | |
| 10,469,285 B2 | 11/2019 | Prüssmeier et al. | |
| 10,566,782 B2 | 2/2020 | Pohl et al. | |
| 10,567,191 B2 | 2/2020 | Pohl et al. | |
| 10,790,622 B2 | 9/2020 | Pohl et al. | |
| 10,942,499 B2 | 3/2021 | Kumar Kn et al. | |
| 2005/0288799 A1* | 12/2005 | Brewer | H05K 7/1472 |
| | | | 361/679.02 |
| 2010/0283560 A1 | 11/2010 | Sommer | |
| 2010/0303138 A1* | 12/2010 | Kitchener | H04L 12/10 |
| | | | 375/224 |
| 2015/0097594 A1* | 4/2015 | Graber | G01R 31/40 |
| | | | 324/764.01 |
| 2015/0109077 A1 | 4/2015 | Tomimbang et al. | |
| 2016/0233665 A1* | 8/2016 | Kitchener | H02H 3/006 |
| 2019/0056708 A1 | 2/2019 | Kumar Kn et al. | |

FOREIGN PATENT DOCUMENTS

| | | |
|---|---|---|
| DE | 10356985 A1 | 7/2005 |
| DE | 10132415 B4 | 4/2008 |
| DE | 102014116594 A1 | 5/2016 |
| DE | 102015105702 B3 | 8/2016 |
| DE | 102016105747 A1 | 10/2017 |
| DE | 102016109450 A1 | 11/2017 |
| DE | 102016110641 B3 | 11/2017 |
| DE | 102016112362 A1 | 1/2018 |
| DE | 102017116385 B3 | 10/2018 |
| EP | 1693944 A2 | 8/2006 |
| EP | 2174425 A1 | 4/2010 |
| EP | 1965482 B1 | 6/2010 |
| EP | 1787374 B1 | 11/2011 |
| EP | 2784977 A1 | 10/2014 |
| EP | 3444912 A1 | 2/2019 |
| WO | 2016061162 A1 | 4/2016 |

OTHER PUBLICATIONS

International Preliminary Report on Patentability dated Jan. 20, 2023 in connection with International Patent Application No. PCT/EP2021/082655, 29 pages includling English translation.

International Search Report and Written Opinion dated Feb. 28, 2022 in connection with International Patent Application No. PCT/EP2021/082655, 21 pages including English translation.

Office Action dated Sep. 24, 2021 in connection with German patent application No. 10 2021 102 357.2, 15 pages including English translation.

Office Action dated Jun. 4, 2024 in connection with Chinese patent application No. 202180090929.6, 9 pages including English translation.

* cited by examiner

SYSTEM AND FIELD DEVICE

CROSS-REFERENCE TO RELATED APPLICATIONS

This patent application is a continuation of International Patent Application No. PCT/EP2021/082655, SYSTEM AND FIELD DEVICE, filed 23 Nov. 2021, which claims the priority of German patent application No. DE 10 2021 102 357.2, SYSTEM UND FELDGERÄT, filed 2 Feb. 2021, each of which is incorporated by reference herein, in the entirety and for all purposes.

FIELD

The present invention relates to a system comprising a feed-in device and a plurality of field devices electrically connected to the feed-in device.

BACKGROUND

An automation system may comprise a plurality of sensors and actuators. A feed-in device electrically connected to such components may be used for the electrical energy supply. The feed-in device may additionally be configured to carry out data communication with the components or to control the components.

In one possible case of use, the sensors and actuators are located in a potentially explosive area (for example, zone 0/20 according to the ATEX directive; ATEX: Atmospheres Explosibles), and the feed-in device is located in a non-explosive or low-explosive area (for example, zone 2/22 according to the ATEX directive). In order to meet explosion protection requirements, the feed-in device may be connected to the sensors and actuators via point-to-point connections or another type of connection such as parallel wiring, wherein special supply lines and connectors may be used for this purpose. For these components, embodiments or construction principles corresponding to the ATEX directive may be used to ensure explosion protection, also referred to as "ignition protection type". For example, an embodiment in accordance with the protection type flameproof enclosure or increased safety is possible. Such measures may be associated with a high wiring effort and high costs.

The PD IEC/TS 60079-39:2015 standard "Explosive atmospheres—Part 39: Intrinsically safe systems with electronically controlled spark duration limitation" describes a system comprising at least a field device (power-i field device) and a feed-in device (power-i source) electrically connected to the field device. The feed-in source is used to supply electrical energy to the field device and is also used to monitor the electrical energy supply. For this purpose, the feed-in source is configured to detect the occurrence of sparks in the electrical energy supply of the field device in order to switch off the energy supply on this basis. The concept specified in this standard has not yet been implemented on the market.

SUMMARY

The present invention provides an improved system.

According to a first aspect, a system is proposed. The system comprises a feed-in device and a plurality of field devices electrically connected to the feed-in device. The feed-in device is configured to provide an electrical energy for electrical energy supply to the field devices. The feed-in device comprises a monitoring device which is configured to detect spark generation in the electrical energy supply and, based on this, to switch off the electrical energy supply. The field devices each comprise a first device section having an input terminal for connecting a supply line, and a second device section.

The electrical energy provided by the feed-in device may be supplied to the first device section via the input terminal and may be transmitted from the first device section to the second device section via an electrical energy supply connection. The second device section comprises a terminal device having at least one output line terminal for connecting at least one output line to forward the electrical energy transmitted to the second device section. The electrical energy supply connection of the first and second device sections comprises a power limiting device configured to cause a limitation of an electrical power transmittable from the first device section to the second device section in the course of the energy transmission.

According to a second aspect, a system is proposed. The system comprises a feed-in device and a plurality of field devices electrically connected to the feed-in device. The feed-in device is configured to provide an electrical energy for electrical energy supply to the field devices. The feed-in device comprises a monitoring device which is configured to detect spark generation in the electrical energy supply and, based on this, to switch off the electrical energy supply. The field devices each comprise a first device section having an input terminal for connecting a supply line, and a second device section.

The electrical energy provided by the feed-in device may be supplied to the first device section via the input terminal and may be transmitted from the first device section to the second device section via an electrical energy supply connection. The second device section comprises a terminal device having at least one output line terminal for connecting at least one output line to forward the electrical energy transmitted to the second device section. The electrical energy supply connection of the first and second device sections comprises a power limiting device configured to cause a limitation of an electrical power transmittable from the first device section to the second device section in the course of the energy transmission. The first device section comprises a decoupling device configured to provide a predetermined input impedance for detecting the spark generation. The first device section comprises an inrush current limiter configured to limit an inrush current at a start of the electrical energy supply. The inrush current limiter is arranged between the decoupling device and the power limiting device.

According to a third aspect, a system is proposed. The system comprises a feed-in device and a plurality of field devices electrically connected to the feed-in device. The feed-in device is configured to provide an electrical energy for electrical energy supply to the field devices. The feed-in device comprises a monitoring device which is configured to detect spark generation in the electrical energy supply and, based on this, to switch off the electrical energy supply. The field devices each comprise a first device section having an input terminal for connecting a supply line, and a second device section.

The electrical energy provided by the feed-in device may be supplied to the first device section via the input terminal and may be transmitted from the first device section to the second device section via an electrical energy supply connection. The second device section comprises a terminal device having at least one output line terminal for connecting at least one output line to forward the electrical energy transmitted to the second device section. The electrical energy supply connection of the first and second device sections comprises a power limiting device configured to cause a limitation of an electrical power transmittable from the first device section to the second device section in the course of the energy transmission. The first device section of at least one field device comprises at least one output terminal for connecting a further supply line to forward the electrical energy supplied to the first device section to a further field device. The first device section of the at least one field device comprises a switching device arranged between the input terminal and the at least one output terminal, with the aid of which the forwarding of the electrical energy supplied to the first device section to the further field device is switchable.

The examples described in the following relate to an improved system that may be used to electrically supply components such as actuators and sensors that may be located in an area having an explosion hazard.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
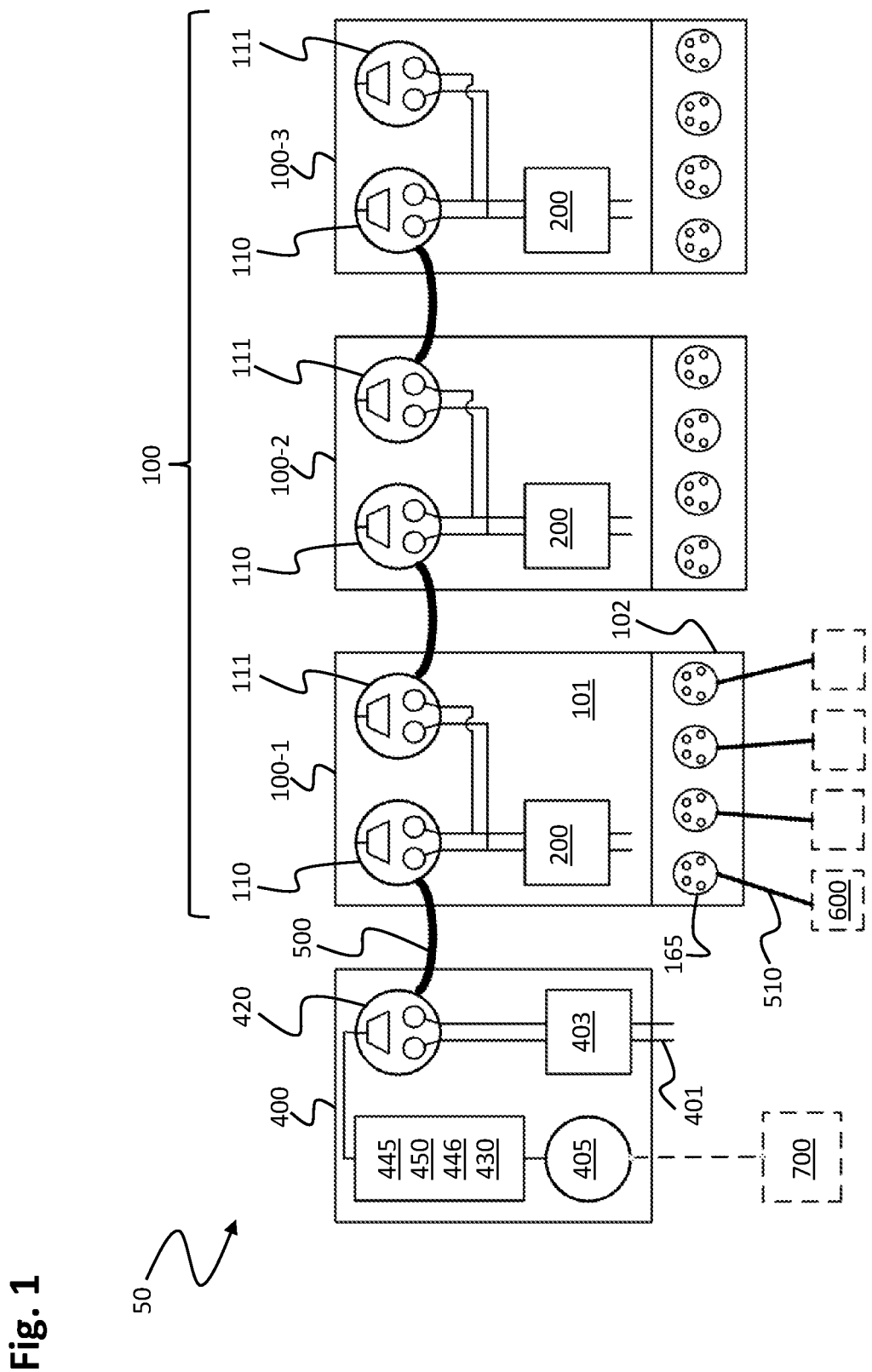
FIG. 1 shows a system comprising a feed-in device, a plurality of field devices and a plurality of field components.

A system is proposed that comprises a feed-in device and a plurality of field devices electrically connected to the feed-in device. The feed-in device is configured to provide an electrical energy for electrical energy supply to the field devices.

Examples

The feed-in device comprises a monitoring device that is configured to detect spark generation in the electrical energy supply and to switch off the electrical energy supply on this basis. The field devices each comprise a first device section having an input terminal for connecting a supply line and a second device section. The electrical energy provided by the feed-in device may be supplied to the first device section via the input terminal and transmitted from the first device section to the second device section via an electrical energy supply connection. The second device section comprises a terminal device comprising at least one output line terminal for connecting at least one output line to forward the electrical energy transmitted to the second device section. The electrical energy supply connection of the first and second device sections comprises a power limiting device configured to cause limiting of an electrical power transmittable from the first device section to the second device section in the course of the energy transmission.

The field devices of the proposed system comprise a first device section having an input terminal and a second device section having a terminal device with at least one output line terminal. Via the input terminal and a supply line connected thereto, the electrical energy provided by the feed-in device of the system may be introduced into the first device section. The first device section and the second device section are connected via an electrical energy supply connection, through which the electrical energy provided to the first device section may be further provided to the second device section. Starting therefrom, the electrical energy may be passed on via the terminal device of the second device section and at least one output line connected thereto. In this way, an external device or component connected to the output line, for example a sensor or an actuator, which is referred to below as a field component, may be electrically supplied. Depending on the embodiment, a plurality of field components or a plurality of sensors and/or actuators may be connected to the terminal device via a plurality of output lines and thereby supplied with energy, as well.

In addition to providing electrical energy, the system's feed-in device is also used for monitoring the electrical energy supply to the field devices. For this purpose, the feed-in device is configured to detect a spark or arc occurring in the electrical energy supply due to an error during its formation and, based on this, to switch off the electrical energy supply with a low latency in order to terminate the spark. Due to the spark duration limitation achieved in this way, it may be prevented with a high or sufficient reliability that, in the event of an error, a spark or ignition spark with sufficient energy for ignition is generated in the area of the input terminals of the first device sections of the field devices and in the area of the supply lines connected to the field devices.

As will be described in more detail below, the first device section of at least one field device may comprise at least one output terminal for connecting a further supply line to pass electrical energy supplied to the first device section. In a corresponding manner, due to the spark duration limitation, generation of a spark having sufficient energy for ignition may be reliably prevented in the region of the at least one output terminal.

With reference to the second device sections of the field devices and field components (sensors and/or actuators) connected thereto via output lines, reliable and safe protection may be achieved in that the electrical energy supply connection of the first and second device sections of the field devices comprises a power limiting device. The power limiting device may be used to limit the electrical power that may be transmitted from the first device section to the second device section or the maximum electrical power that may be transmitted. In this way, it may be ensured that the electrical energy available at the terminal devices or output line terminals of the second device sections of the field devices is limited and is not sufficient to generate a spark or ignition spark in the area of the terminal devices or output line terminals of the second device sections, and thus also in the area of the output lines and the field components connected thereto, in the event of an error.

Due to the aforementioned properties, e.g. the following scenario of use is conceivable for the system. Field components (sensor and/or actuator components) connected to the second device sections of the field devices via output lines may be located in a potentially explosive area (for example, zone 0/20 according to the ATEX directive). The field devices may be located in an area less hazardous with regard to explosion (for example, Zone 1/21 according to the ATEX Directive). The feed-in device may be located in a non-hazardous or low-hazardous area (for example, zone 2/22 according to the ATEX directive).

In this context, the protective mechanisms that may be provided by monitoring the electrical energy supply to the field devices and by power limitation within the field devices make it possible to provide simple and inexpensive designs for the supply lines and output lines used, and for connectors arranged on the lines that may be used to connect the lines to components such as the field devices and field components. Furthermore, it is possible to feed in a relatively large amount of electrical power into the first device sections of the field devices.

Further possible details and embodiments, which may be considered for the system and its components, are described in more detail below.

The electrical energy provided by the feed-in device may be a direct current (DC). To provide the electrical energy, the feed-in device may be electrically connected to an energy source or DC source and in this way be electrically supplied by the energy source.

The field devices of the system may be connected to field components such as sensors and/or actuators as described above in order to electrically supply them. In this context, the field devices may serve as energy distributors for the field components. The field components may be attributed to the system and as a result be components of the system. This correspondingly applies to lines used such as supply lines and output lines and their connectors.

Within the first and second device sections of the field devices, the electrical energy may inter alia be transported via internal electrical conductors. Such an embodiment may also apply with respect to the electrical energy supply connection of the first and second device sections, which may comprise corresponding electrical conductors in addition to the power limiting device. The electrical conductors may be in the form of conductor paths, for example.

The terminal device of the second device section of the field devices is used as described above for connecting at least one or a plurality of output lines via which one or a plurality of field components (sensors and/or actuators) may be electrically supplied in a corresponding manner. For this purpose, the terminal device comprises at least one output line terminal for connecting an output line, as described above.

According to a further embodiment, a reliable limitation of the electrical power transmittable from the first to the second device section may be achieved by the power limiting device of the field devices being configured to cause a current limitation and a voltage limitation. For this purpose, the power limiting device may comprise electrical components such as at least one resistor and at least one voltage limiting component or semiconductor component such as a Zener diode. Furthermore, at least one fuse, possibly together with an optional protective resistor, may be applied. Current limiting may be achieved with the aid of at least one resistor. voltage limiting may be achieved with the aid of at least one voltage-limiting component. If a Zener diode is used for this purpose, it may be operated in the reverse direction. A fuse and a protective resistor, if used, may be used to provide protection, e.g. with respect to the at least one voltage-limiting component. Instead of at least a Zener diode, at least one other semiconductor component suitable for voltage limiting, e.g. a thyristor, may be used, as well.

The terminal device of the second device section of the field devices may have a plurality of output line terminals, allowing for a plurality of output lines to be connected to the terminal device. In this context, the power limiting device may be configured to cause shared current limiting and voltage limiting for the output line terminals. The power limiting device may further be configured to cause a plurality of separate and optionally different current limitations and/or to cause a plurality of separate and optionally different voltage limitations. In this manner, separate and optionally different current limitations and/or voltage limitations may be present with respect to single or multiple output line terminals. For example, the power limiting device may be embodied in such a way that a common voltage limitation and a plurality of small-partitioned or subdivided current limitations are present for the output line terminals, i.e. separate and optionally different current limitations are provided with respect to individual and/or a plurality of output line terminals or groups of output line terminals.

In a further embodiment, the first device section of the field devices comprises a decoupling device that is configured to provide a predetermined input impedance for detecting spark generation. In this way, the field devices may have a known and predictable electrical behavior, which makes it possible to detect spark generation by the feed-in device with a high or sufficient reliability in the event of an error. The decoupling device may be located between the input terminal and the power limiting device. The decoupling device may comprise components such as an LC low-pass filter having an inductor and at least a capacitance. Furthermore, at least one component or semiconductor device such as a diode may be provided to specify a current flow direction. A further possible component is a voltage limiting device, for example in the form of a clamping circuit constructed from voltage-limiting components or semiconductor components such as diodes, which may be connected in parallel to the inductor.

In a further embodiment, the first device section of the field devices has an internal power supply device, which may be electrically supplied via the electrical energy supplied to the first device section. With the aid of the internal power supply device of a field device, at least one internal device or component present in the field device may be supplied with electrical energy, depending on the embodiment. This may e.g. comprise a controller such as a communication controller, as described further below. The communication controller may be a monolithic or discrete communication controller.

In a further embodiment, the first device section of at least one field device as mentioned above has at least one output terminal for connecting a further supply line to pass on the electrical energy supplied to the first device section. The at least one output terminal may be electrically connected to the input terminal of the associated first device section. With reference to this embodiment, it is possible for a supply line connected to an output terminal of one field device to be connected to an input terminal of another field device, so that the electrical energy may be passed from the one field device to the other field device.

Based on the foregoing embodiment, or in the event that a plurality of or all of the field devices of the system comprise at least one output terminal, the following embodiment is further conceivable for the system.

In a further embodiment, the feed-in device is connected to one of the field devices via a supply line, and the field devices are connected to one another via further supply lines, each connecting two field devices. This setup may be characterized by a low wiring effort. The supply lines connecting the field devices may be connected to input terminals and output terminals of field devices. The supply line connecting the feed-in device to one of the field devices may be connected to a feed-in device output terminal of the feed-in device and an input terminal of the field device concerned.

In the aforementioned embodiment, the electrical energy provided by the supply device may be supplied to a field device and, starting from this, forwarded to the further field devices, i.e. in each case from one to another field device. The field devices may also distribute the electrical energy made available to them in this way to other field components (sensors and/or actuators) via output lines connected to them.

It is possible that at least one field device is embodied with multiple output terminals. In this embodiment, the relevant field device may serve as an energy distributor and forward the electrical energy to a plurality of field devices via a plurality of supply lines.

In a further embodiment, the first device section of the at least one field device provided with the at least one output terminal comprises a switching device arranged between the input terminal and the at least one output terminal, with the aid of which the forwarding of the electrical energy supplied to the first device section may be switched. If there is an embodiment with multiple output terminals, a switching device may be provided between the input terminal and each of the output terminals in a corresponding manner. This embodiment makes it possible to separate the input terminal and the at least one output terminal from each other, and to control the forwarding of the electrical energy via the at least one output terminal.

The at least one switching device may e.g. be controlled with the aid of the communication controller described below.

In a further embodiment, the first device section of the field devices has an inrush current limiter, which is configured to limit an inrush current at the start of the electrical energy supply. In this way, it may be avoided that a high or excessive inrush current occurs at one or at a plurality of field devices at the start of the electrical energy supply, with the consequence that an errory (or erroneous) disconnection of the electrical energy supply is carried out by the feed-in device, although no spark generation is present.

The inrush current limiter may comprise components such as a transistor, a resistor connected in series with the transistor, and a regulator. With the aid of the regulator, the current flowing across the resistor may be measured and, depending on this, the transistor may be controlled in such a way and thus the voltage drop across the transistor may be regulated in such a way that the occurrence of an excessive current is avoided.

The inrush current limiter may be arranged between the decoupling device and the input terminal. In this embodiment, the inrush current limiter may be subject to safety requirements, for example with regard to providing redundancy.

In a further embodiment, the inrush current limiter of the field devices is arranged between the decoupling device and the power limiting device. In this way, there may be less stringent requirements with regard to the inrush current limiter, which in this respect may be realized according to a simple embodiment.

In a further embodiment, the field devices have galvanic isolation. This allows the electrical energy supplied to the first device section to be conducted on separate electrical circuits. This embodiment favors reliable and safe operation of the system. The galvanically isolated circuits may be formed at least partially by the field devices or components of the field devices.

A galvanic isolation may be embodied in the first device section and/or in the electrical energy supply connection of the first and second device sections. In this context, it is possible to form the power limiting device with a galvanic isolation. To realize a galvanic isolation, components such as a transformer, an inverter preceding the transformer, a rectifier following the transformer, and a smoothing capacitor may be used.

It is possible to provide galvanic isolation in the feed-in device. In this way, the field devices may be embodied without galvanic isolation.

With reference to the application scenario described above, in which field components (sensors and/or actuators) connected to the field devices via output lines are located in an area hazardous with regard to explosion and the field devices are located in an area less hazardous with regard to explosion, the following embodiment may further be considered to allow for safe operation of the system. In this context, the connections of the first device section of the field devices, i.e. the input terminal of the first device section of the field devices and, if present, at least one output terminal of the first device section of at least one field device, are embodied according to a first type of ignition protection. Furthermore, the connections of the second device section of the field devices, i.e. the at least one output line terminal of the second device section of the field devices, are embodied according to a second type of ignition protection. The second type of ignition protection corresponds to a greater level of protection than the first type of ignition protection.

It is e.g. possible that the second type of ignition protection is the Intrinsic Safety Ex ia type of protection, and that the first type of ignition protection is the Intrinsic Safety Ex ib type of protection. The fulfillment of the different types of protection may be given by the fact that components present in the area of the respective connections of the first and second device section of the field devices, such as internal components and electrical conductors, have embodiments corresponding to the types of protection, for example with regard to distances and redundancies. The monitoring function of the feed-in device may also contribute to the Intrinsic Safety Ex ib of the connections of the first device section of the field devices. With regard to the connections of the second device section, the power limitation due to the power limiting device may contribute to the Intrinsic Safety Ex ia.

To achieve a high level of safety for the system, it may e.g. also be possible to encapsulate the field devices in a cast enclosure. In this case, the field devices or their housings may be filled with a casting compound, which may prevent the penetration of an explosive mixture into the field devices. In this way, the field devices may be embodied in accordance with the Ex mb type of ignition protection. Furthermore, a further or equivalent type of protection for the field devices is possible, for example an embodiment with a flameproof enclosure. This means that the field devices may be embodied in accordance with the Ex db type of ignition protection.

The system or its field devices may be used not only to supply field components (sensors and/or actuators) connected to the field devices electrically, but also to perform data communication and control with reference to these components. In this context, the system may be embodied as an automation system. In this context, the embodiments described below may be applied.

In a further embodiment, the field devices are configured to carry out data communication in that the first device section comprises at least one communication terminal for connecting a data line for receiving and/or transmitting data signals and a communication controller connected to the at least one communication terminal. In this way, the communication controller may receive and/or transmit data signals via the communication terminal. The communication controller is connected to the terminal device of the second device section via a communication connection to receive and/or to transmit data signals via the terminal device. The communication connection of the communication controller and of the terminal device has a barrier device which is configured to cause a limitation of an electrical power transmittable from the communication controller to the terminal device during a data communication and/or a galvanic isolation.

The aforementioned embodiment offers the possibility of carrying out data communication with field components (sensors and/or actuators) connected to the terminal devices or output line terminals via output lines via the field devices or via their communication controllers. For example, sensor data or sensor signals from sensors may be read out and forwarded via the field devices. Furthermore, control data or control signals may be transmitted to actuators.

In this context, the system may further comprise a superordinate controller suitably connected to the field devices, to which the field devices or their communication controllers may transmit such data signals and/or from which the field devices or their communication controllers may receive such data signals.

At least one field device or a plurality of or all field devices of the system may further comprise a plurality of or two communication connections connected to the associated communication controller. In this way, data communication may further take place (respectively) via two field devices connected by a data line or via a plurality of field devices connected by data lines.

In the field devices embodied for data communication, the communication connection of the communication controller of the first device section and the terminal device of the second device section has a barrier device as indicated above. The barrier device may be used to limit the electrical power that may be introduced into the second device section of the field devices in the course of data communication. This may ensure that no spark or ignition spark may be caused in the area of the terminal devices or output line terminals of the second device sections of the field devices, and thus also in the area of the output lines and the field components (sensors and/or actuators) connected to the field devices via the output lines, as a result of the data communication. As a result, the application scenario described above, in which field components connected to the field devices are located in a hazardous area and the field devices are located in a less hazardous area, is available in a corresponding manner for the system with the field devices embodied for data communication.

Within the first and second device section of the field devices, the data communication may, inter alia, take place via internal data connections or data lines with corresponding electrical conductors. Such an embodiment may also apply with respect to the communication connection of the first and second device section, which may comprise corresponding data lines or electrical conductors in addition to the barrier device. The electrical conductors may e.g. be in the form of conductor paths.

The barrier device of the communication connection of the first and second device section of the field devices may be realized in the form of a digital isolator such as an optocoupler or a magnetic coupler. In this way, reliable power limitation in combination with galvanic isolation may be achieved by the barrier device.

In a further embodiment, the terminal device of the second device section of the field devices comprises an input/output controller. The input/output controller may be configured to control the receiving and/or transmitting of data signals via the terminal device. In this way, reliable data communication with field components (sensors and/or actuators) connected to the terminal devices or output line terminals of the field devices via output lines is possible. The input/output controller may communicate with the associated communication controller of the first device section via the communication connection to transmit or receive corresponding data signals to and from the communication controller. The input/output controller may additionally or alternatively be configured to control a forwarding of electrical energy via the terminal device. In this way, the forwarding and thus distribution of electrical energy via the terminal device may be flexibly determined. This may e.g. be controlled by the communication controller, which may transmit corresponding data signals or control data to the input/output controller for this purpose. In the aforementioned cases, communication between the communication controller and the input/output controller may take place, e.g. according to a predefined communication protocol, as well as via corresponding interfaces of the communication controller and the input/output controller.

In a further embodiment, the field devices are configured to perform data communication via the at least one communication terminal of the first device section according to a first communication protocol. The field devices are further configured to carry out data communication via the terminal device of the second device section according to a second communication protocol that is different from the first communication protocol. This makes it possible to decouple the data communication between the field devices and field components (sensors and/or actuators) connected thereto via output lines from the remaining data communication, i.e. between the field devices themselves and between the field devices and the superordinate controller, which may take place via the feed-in device if necessary, and thus to configure it with regard to different requirements. For example, data communication between the field devices and field components connected to them may be carried out at a lower data transmission rate than the rest of the data communication.

The data communication according to the different communication protocols may take place via corresponding interfaces or physical interfaces and, as the case may be, further internal devices or components, which may be arranged in the first and second device section of the field devices. Such components may be assigned to or comprised in the communication controller of the first device section and the terminal device or the input/output controller of the second device section.

The first communication protocol may e.g. refer to an Ethernet communication with a data transfer rate of, for example, 100 MBit. This may e.g. be EtherCAT. The second communication protocol may e.g. refer to a communication according to HART or Profibus PA. It is possible that the second communication protocol also relates to an Ethernet communication, wherein a smaller data transmission rate of, for example, 10 MBit is applied compared to the first communication protocol. In this case, internal devices of the terminal device or of the input/output controller used for data communication may e.g. also be embodied according to the future APL standard (Advanced Physical Layer).

In a further embodiment, a physical interface is arranged between the communication controller and the at least one communication terminal of the first device section of the field devices. With the aid of the physical interface, which may also be referred to as PHY and which may be implemented in the form of a physical interface module, processing in the form of encoding or decoding of data signals may take place. In addition or as an alternative, a barrier circuit is arranged between the communication controller and the at least one communication terminal of the first device section of the field devices, which is configured to cause a limitation of an electrical power transmittable to the communication terminal of the first device section during a data communication and/or a galvanic isolation.

In this way, in accordance with the barrier device specified above, a high level of security may be achieved with respect to data communication. With the aid of the barrier circuit, it may be achieved that no spark or ignition spark may be caused in the area of the communication terminal, and thus also in the area of a data line connected thereto, due to the data communication. The barrier circuit may have electrical components such as at least one diode and at least one resistor for power limitation and/or a transformer or a capacitor for galvanic isolation.

In an embodiment of a field device having a plurality of or two communication connections, a physical interface and/or barrier circuit may be arranged between each of the communication connections and the communication controller.

Provided that the field devices as described above are configured to carry out data communication in addition to forwarding or distributing electrical energy, the following embodiments may also be used to keep the cabling effort as low as possible.

In a further embodiment, the input terminal of the first device section of the field devices is embodied as a hybrid connection comprising the at least one communication terminal, to which a supply line in the form of a hybrid line may be connected. In this embodiment, the input terminal may be used to feed in electrical energy for energy supply and to transmit data signals. In a corresponding manner, the supply line connected to the input terminal may simultaneously function as a data line via which electrical energy for energy supply and data signals may be transmitted.

As indicated above, the first device section of at least one field device of the system may comprise at least one output terminal. In a further embodiment, it is provided that the at least one output terminal is embodied as a further hybrid connection comprising a communication terminal, to which a further supply line in the form of a hybrid line may be connected. In this embodiment, the output terminal may be used to pass on electrical energy for energy supply and to transmit data signals. In a corresponding manner, the supply line connected to the output terminal may simultaneously function as a data line via which electrical energy for energy supply and data signals may be transmitted.

The output line terminals of the terminal devices of the second device section of the field devices may also be embodied as hybrid connections via which electrical energy and data signals may be transmitted. In a corresponding manner, the output lines that may be connected here, which may be used to connect the field devices with field components (sensors and/or actuators), may be embodied as hybrid lines for transmitting electrical energy and data signals.

With reference to the system feed-in device, the following embodiments may further be considered.

The feed-in device may comprise a current supply input through which the feed-in device may be electrically connected to a current source or DC power source to be electrically supplied by the current source. The feed-in device may further comprise a feed-in device limiting device which is configured to cause a limitation of the electrical power supplied to the feed-in device via the energy supply input. In this way, the electrical power provided by the feed-in device for energy supply to the field devices may be limited at the same time. The feed-in device limiting device may be configured to effect a current limitation and a voltage limitation.

As indicated above, the feed-in device may have galvanic isolation. The galvanic isolation may be embodied in the feed-in device limiting device.

In a further embodiment, the monitoring device of the feed-in device comprises a first detector, a second detector, a feed-in device switching device, and a control unit. The control unit may be connected to the two detectors and to the feed-in device switching device. The first detector may be configured to detect a change in current when a make spark is generated. Such a spark may occur when a circuit is closed or short-circuited. The second detector may be configured to detect a change in current when break spark occurs. Such a spark may occur when a circuit is opened or disconnected. During operation, the detectors may be used to detect a change in current that reflects the occurrence of a spark, and the control unit may use this as a basis for switching off the electrical energy supply to the field devices by appropriately activating the feed-in device switching device.

The feed-in device may further have a feed-in device output terminal for connecting a supply line. The feed-in device may be connected to one of the field devices via this supply line.

With regard to data communication, the system may comprise a superordinate controller as described above. In this context, it may be considered that the superordinate controller is connected to the field devices via the feed-in device in order to communicate or exchange data signals with them.

For this purpose, the feed-in device may be configured to carry out data communication. For this purpose, the feed-in device may comprise a communication input via which the feed-in device may be connected to the superordinate controller in order to receive data signals from the controller and/or send them to the controller. The feed-in device may further comprise a feed-in device communication controller, two physical feed-in device interfaces for encoding and decoding data signals, respectively, a feed-in device barrier circuit, and a feed-in device communication terminal.

The feed-in device communication terminal and a data line connected thereto may connect the feed-in device to one of the field devices to transmit and/or receive data signals to and/or from the field device. A first of the physical feed-in device interfaces may be located between the communications input and the feed-in device communications controller, and the second physical feed-in device interface may be located between the feed-in communications terminal and the feed-in device communications controller. The feed-in device barrier circuit may be arranged between the feed-in device communication terminal and the second physical feed-in device interface. The feed-in device barrier circuit may be configured to cause a limitation of the electrical power that may be transmitted during a data communication and/or to cause a galvanic isolation.

According to the field devices, the feed-in device output terminal may be embodied as a hybrid connection comprising the feed-in device communication terminal, to which a supply line embodied as a hybrid line may be connected. In this way, electrical energy for energy supply and data signals may be transmitted via the supply line.

A field device is proposed for a system comprising a feed-in device. The feed-in device is configured to provide an electrical energy for electrical energy supply to the field device and to detect spark generation in the electrical energy supply to switch off the electrical energy supply based thereon. The field device comprises a first device section having an input terminal for connecting a supply line and a second device section.

The electrical energy provided by the supply device may be supplied to the first device section via the input terminal and transmitted from the first device section to the second device section via an electrical energy supply connection. The second device section comprises a terminal device having at least one output line terminal for connecting at least one output line to forward the electrical energy transmitted to the second device section. The electrical energy supply connection of the first and second device sections comprises a power limiting device configured to cause limiting of an electrical power transmittable from the first device section to the second device section in the course of the energy transmission.

For the proposed field device, embodiments, features and details described above may be applied in a corresponding manner. When the field device is used in a system, advantages described above may be obtained in the same way. In this context, the feed-in device of the system may be used to suppress the generation of a spark or ignition spark with sufficient energy for ignition in the region of the input terminal of the first device section of the field device and in the region of a supply line connected to the field device in the event of an error. The power limiting device of the field device and the power limitation achieved thereby may ensure that, in the event of an error, no spark or ignition spark can occur in the region of the terminal device or the at least one output line terminal of the second device section, and thus also in the region of at least one field component (sensor or actuator) connected to the terminal device of the field device via an output line.

With respect to the system described above and comprising a plurality of field devices, and with respect to the aforementioned field device, the following is further pointed out. The above described design of the field devices with a first device section and a second device section may be based on a circuitry view of the field devices. From the point of view of explosion protection, a design with three areas may be used for the field devices. For the purpose of differentiation, these areas are referred to below by the phrase "device section", i.e. first device section, second device section and third device section. The first device section comprises the input terminal and, if present, the at least one output terminal, and the second device section comprises the at least one output line terminal of a field device. The third device section, which respectively refers to the remaining field device or remaining components of a field device, comprises the circuit or, respectively, circuit components connected to the respective connections.

The first device section (input terminal, output terminal) may correspond to a first type of ignition protection, the second device section (output line terminal) may correspond to a second type of ignition protection, and the third device section (remaining field device) may correspond to a third type of ignition protection. The first, second, and third ignition protection types may be different from each other.

According to the above description, the field devices or their connections may be embodied in such a way that the first ignition protection type is Intrinsic Safety Ex ib, and that the second ignition protection type is Intrinsic Safety Ex ia. The monitoring function of the feed-in device may also contribute to the Intrinsic Safety Ex ib of the first equipment section, and the power limitation achieved within the field devices may contribute to the Intrinsic Safety Ex ia of the second equipment section. With reference to the third type of protection, an embodiment of the field devices with a cast enclosure or with another equivalent design such as a pressure-proof enclosure may be considered, so that the third type of ignition protection may be the Ex mb or Ex db type of protection.

The embodiments described above may be used individually or in any combination with one another.

On the basis of the following schematic figures, embodiments of a system are described with the aid of which field components such as actuators and sensors may be supplied with energy and communication with the field components or control of the field components may be carried out. The field components may be located in a potentially explosive area.

Further Illustrations

By way of further illustration, FIG. 1 shows a schematic diagram of a system 50. The system 50 comprises a feed-in device 400, a plurality of field devices 100 electrically connected to the feed-in device 400, and a plurality of field components 600 electrically connected to the field devices 100. With respect to the field components 600, the connection is indicated only with respect to one of the field devices 100. The feed-in device 400 is, inter alia, configured to provide an electrical energy to electrically supply the field devices 100 and also the field components 600. The electrical energy is a direct current electrical energy.

According to the embodiment shown in FIG. 1, the system 50 comprises a series or string of three field devices 100, which are denoted by the reference numerals 100-1, 100-2, 100-3 to distinguish them in FIG. 1, and which are also referred to below as first field device 100-1, second field device 100-2, and third field device 100-3. Apart from the above, the system 50 may comprise a different or larger number of field devices 100.

The electrical connection between the feed-in device 400 and the field devices 100 or between the field devices 100 among one another is established via supply lines 500. As shown in FIG. 1, the feed-in device 400 is connected to the first field device 100-1 via a supply line 500. The first field device 100-1 is connected to the second field device 100-2, and the second field device 100-2 is connected to the third field device 100-3, each via a further supply line 500.

The supply lines 500 are connected to corresponding connections of the feed-in device 400 and the field devices 100. The feed-in device 400 comprises a feed-in device output terminal 420 through which electrical energy provided by the feed-in device 400 may be output. The field devices 100 comprise an input terminal 110 and an output terminal 111. The input terminal 110 of the field devices 100 is for supplying electrical energy to the field devices 100, and the output terminal 111 is for passing the supplied electrical energy, or a part thereof, to another field device 100.

The supply line 500 connecting the feed-in device 400 to the first field device 100-1 is connected to the feed-in device output terminal 420 of the feed-in device 400 and to the input terminal 110 of the first field device 100-1. With reference to the connection between the first and second field devices 100-1, 100-2 and between the second and third field devices 100-2, 100-3, the respective supply line 500 is connected to the output terminal 111 of the first field device 100-1 and the input terminal 110 of the second field device 100-2 and to the output terminal 111 of the second field device 100-2 and the input terminal 110 of the third field device 100-3, respectively. The supply lines 500 may comprise electrical conductors or wires for transporting electrical energy and connectors with corresponding contacts at their ends, with the aid of which the supply lines 500 may be plugged for connection to the respective connections.

The field devices 100 are further configured to establish an electrical connection with the external field components 600 of the system 50, as illustrated in FIG. 1 merely with reference to the first field device 100-1. In this manner, the field components 600 may be electrically supplied by the electrical energy provided by the feed-in device 400 and transmitted to the field devices 100. The field components 600 may be sensors and/or actuators of the system 50.

The field devices 100 comprise a plurality of output line terminals 165 for connecting output lines 510. Apart from the embodiment shown in FIG. 1 with four output line terminals 165 per field device 100, the field devices 100 may be embodied with a different or larger number of output line terminals 165. A field component 600 may be connected to a field device 100 via an output line 510. Corresponding to the supply lines 500, the output lines 510 may have cores and connectors with corresponding contacts at their ends, with the aid of which the output lines 510 may be plugged to the output line terminals 165 of the field devices 100 and corresponding connections of the field components 600 for connection.

The electrical energy provided by the feed-in device 400 may be introduced into the first feed-in device 100-1 via the supply line 500 connecting the feed-in device 400 to the first field device 100-1. Starting from this, the electrical energy may be passed from the first field device 100-1 to the second field device 100-2, and starting from this to the third field device 100-3 via the supply lines 500 connecting the respective field devices 100. The electrical energy introduced into the individual field devices 100 may further be passed on or distributed to the field components 600 via the output lines 510 connected to the field devices 100. The field devices 100 may thereby serve as energy distributors for the field components 600.

In addition to the feed-in device 400, the field devices 100, and the field components 600, the system 50 comprises a superordinate controller 700 used to control the system 50. The controller 700 is, inter alia, used to control actuators using control data or control signals, which is, inter alia, carried out based on sensor data or sensor signals from sensors. Accordingly, the system 50 is configured to carry out data communication to enable data exchange between, among other things, the controller 700 and the field components 600. In this regard, data communication may be performed between the field devices 100 and the field components 600 connected thereto, between the field devices 100 and one another, between the first field device 100-1 and the feed-in device 400, and between the controller 700 and the feed-in device 400. In this context, the feed-in device 400 may serve as a communication intermediary between the controller 700 and the field devices 100, and the field devices 100 may in turn serve as a communication intermediary between the feed-in device 400 and the field components 600.

In order to keep the wiring low, the data communication between the feed-in device 400 and the field devices 100 or between the feed-in device 400 and the first field device 100-1 as well as between the field devices 100 among one another, as well as the data communication between the field devices 100 and the field components 600, takes place via the same interfaces and lines as they are used for the electrical energy supply. In this respect, the supply device output terminal 420 of the feed-in device 400 and the input terminals 110, output terminals 111, and output line terminals 165 of the field devices 100 serve as hybrid connections through which both electrical energy for energy supply and data signals may be transmitted. In a corresponding manner, the energy supply lines 500 and output lines 510 serve as hybrid lines for transmitting electrical energy and data signals. Further details on this will be described in more detail below.

Figure 2:
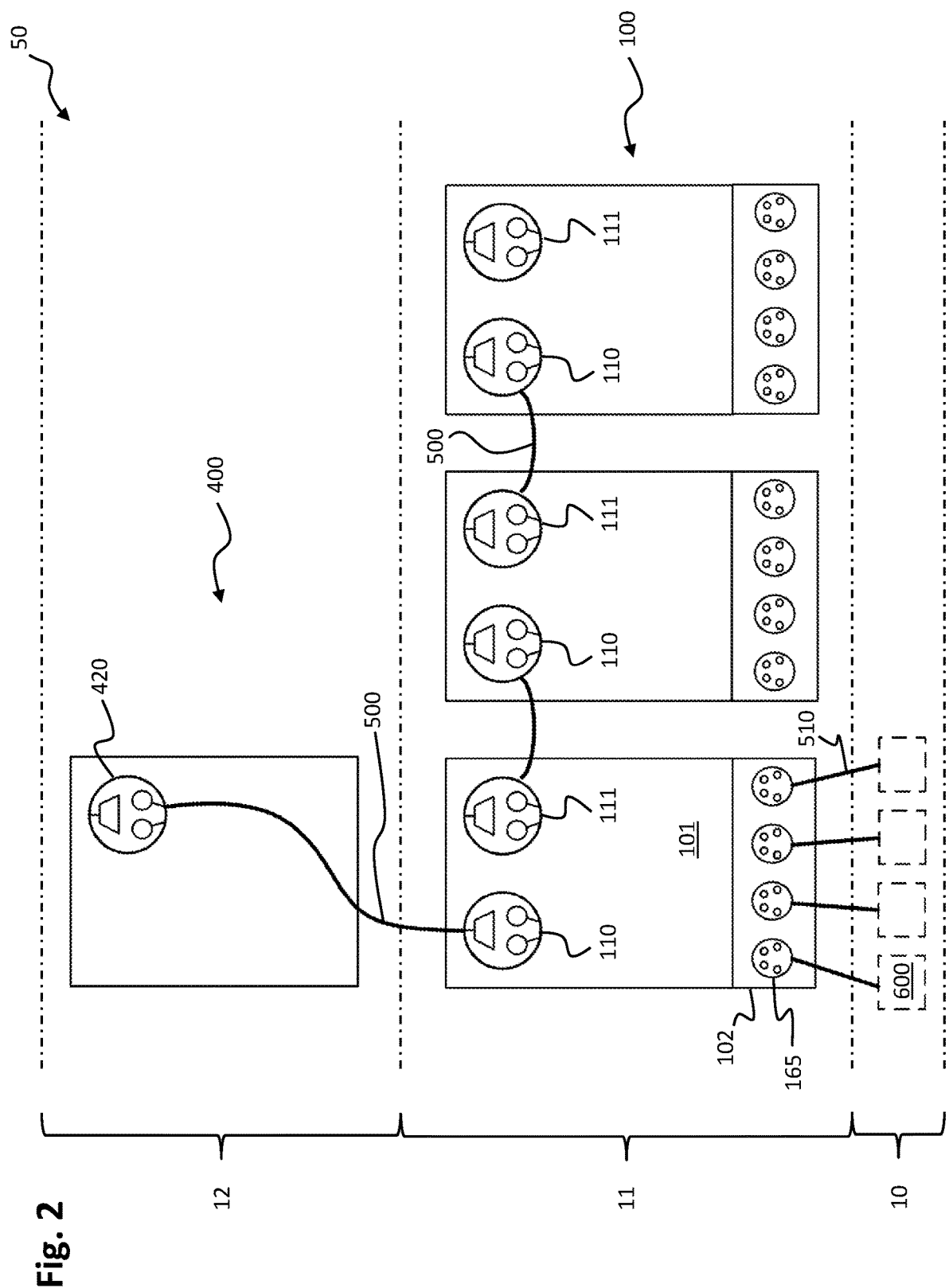
FIG. 2 shows an application scenario of the system in which the feed-in device, the field devices and the field components are located in different areas.

FIG. 2 illustrates a possible application scenario that may be considered for the system 50. Here, the field components 600 connected to the field devices 100 are located in a first area 10. The first area 10 is a hazardous area. In the first area 10, a hazardous explosive atmosphere as a mixture of air and flammable gases, vapors, mists, or dusts may be present continuously, for long periods of time, or frequently. The first area 10 may e.g. be a zone 0/20 according to the ATEX directive. The field devices 100 are arranged in a second area 11. The second area 11 is a less explosive area, unlike the first area 10. A hazardous explosive atmosphere may occasionally form in the second area 11 as a mixture of air and flammable gases, vapors, mists or dusts. The second area 11 may e.g. be a zone 1/21 according to the ATEX directive. The feed-in device 400 is located in a third area 12. Unlike the other areas 10, 11, the third area 12 is a non-hazardous or low-hazardous area. In the third area 12, a hazardous explosive atmosphere as a mixture of air and combustible gases, vapors, mists or dusts may not occur, or may occur only rarely and for a short time. The third area 12 may e.g. be a zone 2/22 according to the ATEX directive.

The application scenario shown in FIG. 2 may be made possible by, on the one hand, monitoring the electrical energy supply to the field devices 100 in order to extinguish a developing spark by quickly switching off the energy supply in the event of an error, and, on the other hand, providing a power-limiting embodiment for the field devices 100. In this context, the feed-in device 400 and the field devices 100 may be configured as described below.

Figure 3:
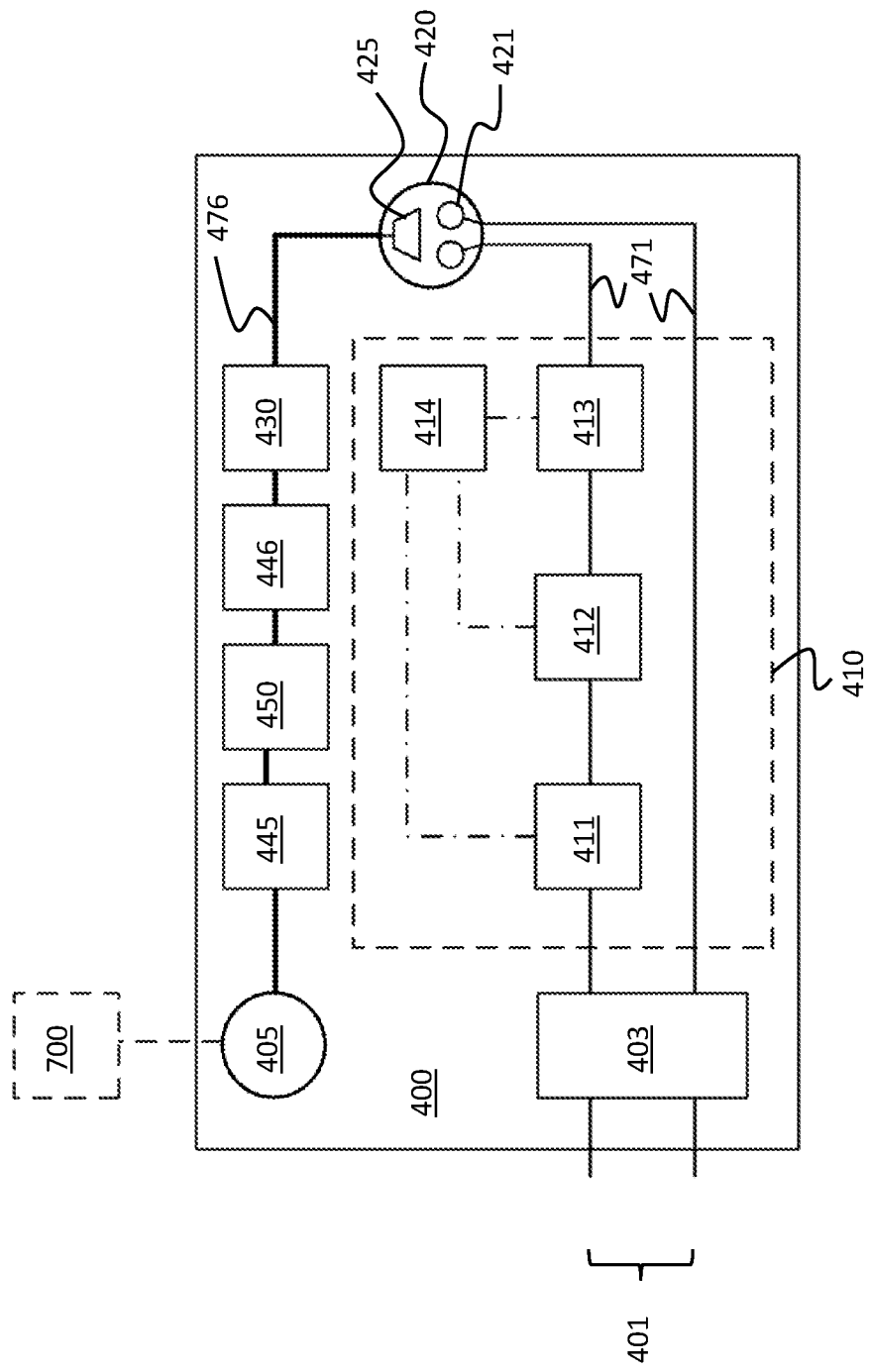
FIG. 3 is a depiction of the feed-in device.

FIG. 3 shows an illustration of the feed-in device 400 of the system 50 according to a possible embodiment. With respect to providing electrical energy, the feed-in device 400 comprises a current supply input 401, via which the feed-in device 400 may be electrically connected to a current source or DC source, and in this way may be electrically supplied by the current source. A further component is a feed-in device limiting device 403. The feed-in device limiting device 403 is configured to cause a limitation of the electrical power supplied to the feed-in device 400 via the current supply input 401 before it is passed on to the field devices 100 (or, according to the representation of FIG. 1, to the first field device 100-1 and via this to the further field devices 100) within the framework of the electrical energy supply via the feed-in device output terminal 420. The feed-in device limiting device 403 may be used to effect current limiting and voltage limiting. Moreover, the feed-in device 400 may have a galvanic isolation, which may be embodied in the feed-in device limiting device 403.

The feed-in device 400 further comprises a monitoring device 410, which is configured to detect a spark generation in the electrical energy supply of the field devices 100 due to an error and to switch off the electrical energy supply based thereon. The detection and shutdown are carried out with a low latency to prevent a spark or ignition spark from being generated with relevant or sufficient energy for ignition.

As shown in FIG. 3, the monitoring device 410 comprises a first detector 411, a second detector 412, a feed-in device switching device 413, and a control unit 414 connected to both detectors 411, 412 and the feed-in device switching device 413. The first detector 411 may be configured to detect a change in current when a make spark is generated. Such a spark may be caused by a closing or short-circuiting of an electrical circuit. The change in current that occurs may be an increase in electrical current over time (i.e., +di/dt). The second detector 412 may be configured to detect a change in current when a break spark occurs. Such a spark may be generated by an opening or breaking of an electrical circuit. The resulting change in current may be a reduction in electrical current over time (i.e., −di/dt).

During operation of the monitoring device 410, the first and second detectors 411, 412 may be used to detect a current change characteristic of a spark generation and thus the spark generation. Based on this, the control unit 414 may switch off the electrical energy supply to the field devices 100 by appropriately controlling the feed-in device switching device 413. This is associated with an extinction of the spark and consequently with a spark duration limitation.

In FIG. 3, internal electrical conductors 471 of the feed-in device 400 are indicated through which electrical energy may be transported within the feed-in device 400 and through which components of the feed-in device 400, including the feed-in device output terminal 420, are interconnected. With reference to the feed-in device output terminal 420, two internal conductors 471 are routed to and connected to two terminal contacts 421 of the feed-in device output terminal 420. The terminal contacts 421 may be contacted by contacts of a connector of a supply line 500 (cf. FIG. 1) provided for connection to the feed-in device output terminal 420, wherein the electrical energy provided by the feed-in device 400 may be conducted via the respective supply line 500.

Figure 4:
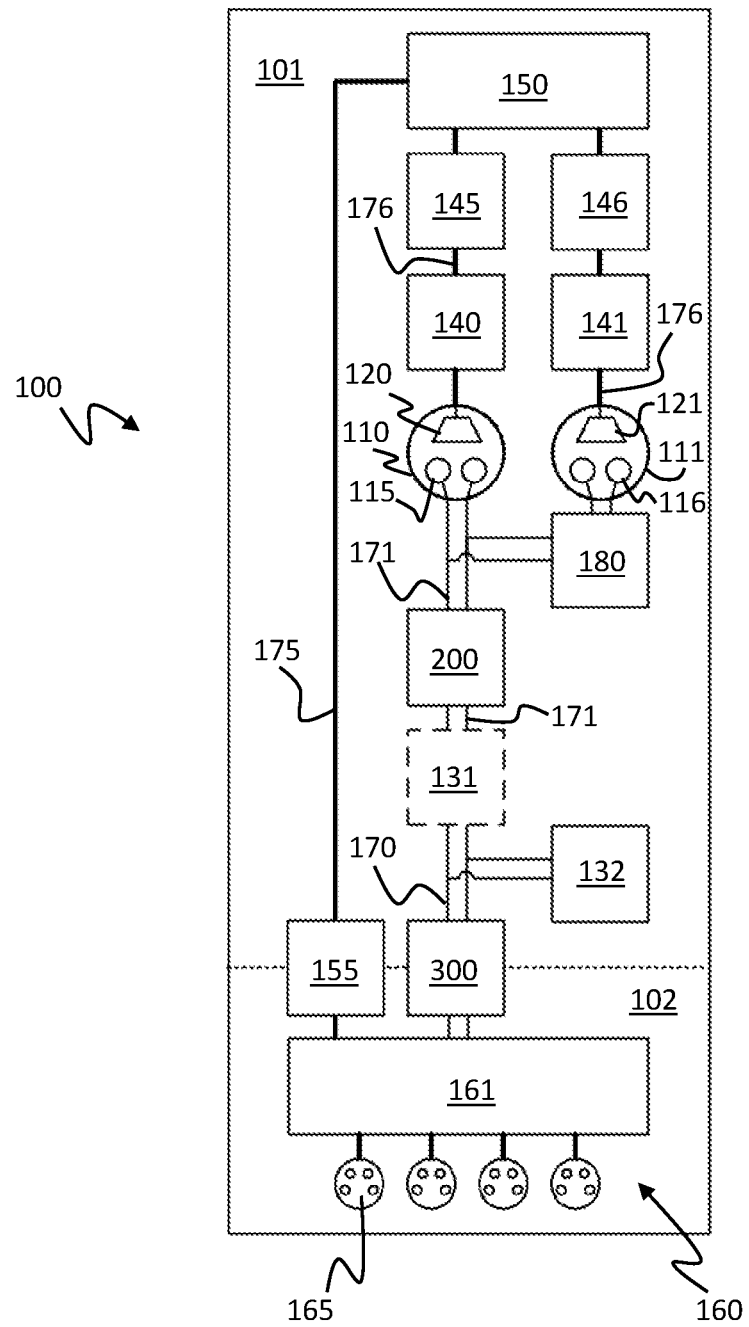
FIG. 4 is a depiction of a field device according to an embodiment in which the field device comprises an input terminal and an output terminal.

FIG. 4 shows a depiction of a field device 100 of the system 50 according to a possible first embodiment. This illustration, as well as the following description, may apply to all field devices 100 of the system 50. The field device 100 comprises a first device section 101 and a second device section 102. The first device section 101 comprises the connections described above and used for connecting supply lines 500, i.e., the input terminal 110 and the output terminal 111. Via the input terminal 110, the electrical energy provided with the aid of the feed-in device 400 may be introduced into the first device section 101 of the field device 100. The output terminal 111 may be used to output the electrical energy and transmit it to another field device 100. FIG. 4 further indicates internal electrical conductors 171 of the field device 100 through which the electrical energy may be transported or transmitted within the field device 100, and through which components of the field device 100 such as the input terminal 110 and the output terminal 111 are interconnected. The internal conductors 171 may be embodied as conductive traces.

The input terminal 110 has two terminal contacts 115, which are connected to two internal electrical conductors 171. The output terminal 111 also has two terminal contacts 116, which are connected to two internal electrical conductors 171. The terminal contacts 115, 116 of the input terminal 110 and of the output terminal 111, which are used in the context of the electrical energy supply, may each be contacted by contacts of connectors of supply lines 500 (cf. FIG. 1) used for connection to the input terminal 110 and the output terminal 111, as a result of which the electrical energy may be fed in or passed on via the respective supply line 500.

As shown in FIG. 4, the second device section 102 comprises a terminal device 160 that comprises output line terminals 165 used to connect output lines 510. The field device 100 may be connected to field components 600 via the output line terminals 165 and output lines 510 connected thereto (see FIGS. 1-2). The terminal device 160 further comprises an input/output controller 161 connected to the output line terminals 165, which may be used in data communication as described further below. The first device section 101 and the second device section 102 are connected via an electrical energy supply connection 170, via which electrical energy supplied to the first device section 101 via the input terminal 110 may be transmitted to the second device section 102, and thus to the terminal device 160 having the output line terminals 165. In this regard, as indicated in FIG. 4, the electrical energy introduced into the second device section 102 may be conducted to the output line terminals 165 via the input/output controller 161 or via the input/output controller 161, respectively, or it may be conducted past the input/output controller 161 or in parallel to the input/output controller 161. From here, electrical energy may be forwarded to the field components 600.

As shown in FIG. 4, the electrical energy supply connection 170 of the field device 100 comprises, in addition to internal electrical conductors 171, a power limiting device 300. The power limiting device 300, which is located between the input terminal 110 and the terminal device 160 or the input/output controller 161, is configured to cause a limitation of the maximum electrical power that may be transferred from the first device section 101 to the second device section 102 in the course of the energy transmission. With the aid of the power limiting device 300, a current limitation and a voltage limitation may be caused. The power limitation is configured in such a way that the electrical energy available, taking into account all downstream energy storage devices, is insufficient to produce a spark or an ignition spark in the event of an error. Possible embodiments of the power limiting device 300 are described in more detail below with reference to FIGS. 8-11.

The system 50 thus employs, with respect to the electrical energy supply, different protection mechanisms, each of which provides a high level of safety, thus enabling the application scenario shown in FIG. 2. With the aid of the monitoring device 410 of the feed-in device 400, a spark occurring in the electrical energy supply of the field devices 100 due to an error may be reliably detected in the area of the input terminals 110 and output terminals 111 of the first device sections 101 of the field devices 100 and in the area of the supply lines 500 connected thereto in its formation, and based on this, the electrical energy supply may be switched off with a low latency in order to extinguish the spark. As described above, the resulting spark duration limitation prevents the generation of a spark with sufficient energy for ignition in the area of the input terminals 110, output terminals 111 and supply lines 500. In this way, the field devices 100 may be arranged in zone 1/21 according to the ATEX directive (second area 11 according to FIG. 2).

With regard to the second device sections 102 of the field devices 100, the power limiting device 300 is used to cause a limitation of the maximum electrical power that may be transmitted from the first device section 101 to the second device section 102. This may ensure with a high degree of reliability that the available electrical energy is limited in such a way that, in the event of an error, no spark or ignition spark with sufficient energy for ignition may be generated in the region of the terminal devices 160 or output line terminals 165 of the second device sections 102 of the field devices 100, the output lines 510 and the field components 600 connected to the field devices 100 via the output lines 510. As a result, the field components 600 may be arranged in zone 0/20 as defined by the ATEX directive (first area 10 as shown in FIG. 2).

Due to the monitoring of the electrical energy supply to the field devices 100 and the power limitation within the field devices 100, it is further possible to provide simple and inexpensive designs for the supply lines 500 and output lines 510, and for the connectors arranged on the lines 500, 510. It is also possible to introduce a relatively large amount of electrical power into the first device sections 101 of the field devices 100.

Based on the field device 100 shown in FIG. 4, further features and details become apparent which may be considered for the field devices 100 of the system 50. According to the embodiment shown in FIG. 4, the first device section 101 comprises a switching device 180. Via the switching device 180 and internal electrical conductors 171, the input terminal 110 used to introduce electrical energy into the first device section 101 and the output terminal 111 used to output or transmit the electrical energy are connected to each other. With the aid of the switching device 180, the forwarding of the electrical energy may be switched. In this embodiment, disconnection and connection of the input terminal 110 and the output terminal 111 may be caused by appropriately actuating the switching device 180 arranged between the input terminal 110 and the output terminal 111, thereby flexibly controlling the forwarding of the electrical energy via the output terminal 111.

The first device section 101 of the field device 100 depicted in FIG. 4 further comprises a decoupling device 200 arranged between the input terminal 110 and the power limiting device 300. The decoupling device 200 is configured to provide a predetermined input impedance of the field device 100 with respect to detecting spark generation. This allows the field device 100 to have a known and predictable electrical behavior, which allows spark generation to be detected with a high degree of reliability and accuracy by the feed-in device 400 in the event of an error.

Figure 5:
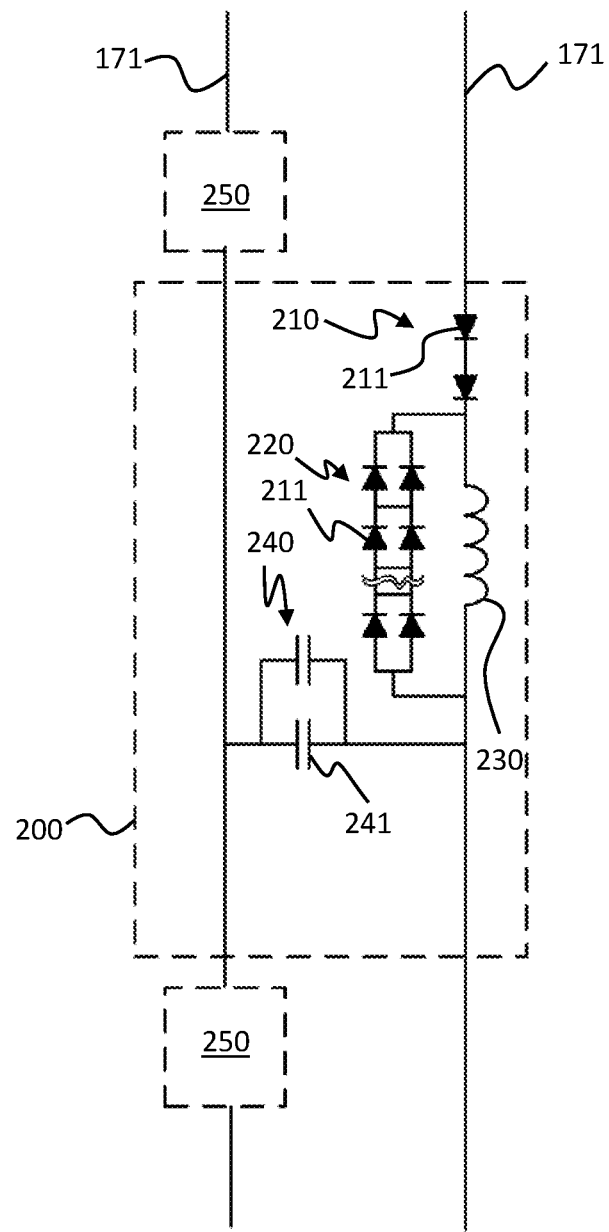
FIG. 5 shows a decoupling device of a field device.

FIG. 5 shows a possible embodiment of the decoupling device 200. The decoupling device 200 comprises an LC low-pass filter with an inductor 230 and a capacitive assembly 240, which is connected in parallel to one end of the inductor 230 and via which a conductor path comprising the inductor 230 is connected to a further conductor path. At an end of the inductor 230 opposite thereto is a further assembly 210 connected in series with the inductor 230. According to the embodiment shown in FIG. 5, the further assembly 210 comprises two serially connected diodes 211, and may therefore also be referred to as a diode assembly. A further component of the decoupling device 200 is a voltage limiting device connected in parallel to the inductor 230, which according to the embodiment shown in FIG. 5 is realized as a clamping circuit 220 comprising two strings of serially connected diodes 211, the strings and the diodes 211 being connected in parallel to one another. The capacitive assembly 240 comprises two capacitors 241 connected in parallel to each other.

The predetermined input impedance is provided by the inductor 230 and the capacitive assembly 240 of the decoupling device 200. The further assembly 210 serves to preset a current flow direction. The voltage limiting device or clamping circuit 220 is used to preset a maximum voltage drop across the inductor 230 and to convert the excess voltage into heat in the event of a voltage excess, for example due to a break in an internal electrical conductor 171 at one end of the inductor 230.

FIG. 5 further depicts the possibility of providing an inrush current limiter 250 in the first device section 101 for the field device 100 shown in FIG. 4 (and thus all field devices 100 of the system 50). The inrush current limiter 250 may be arranged between the decoupling device 200 and the input terminal 110, as indicated in FIG. 5 by a position above or on the input side of the decoupling device 200. Alternatively, the inrush current limiter 250 may be arranged between the decoupling device 200 and the power limiting device 300, as indicated in FIG. 5 by a position below or on the output side of the decoupling device 200.

The inrush current limiter 250 is configured to limit an inrush current at a start of the electrical energy supply. In this way, it may be avoided that a high or excessive inrush current occurs at one or a plurality of field devices 100 at the start of the electrical energy supply with the consequence that the feed-in device 400 used for monitoring erroneously switches off the energy supply, although no spark generation is present. The inrush current limiter 250 may e.g. be used to achieve slow charging of any local capacitances present.

When the inrush current limiter 250 is arranged between the decoupling device 200 and the input terminal 110 (upper position in FIG. 5), the inrush current limiter 250 may be subject to safety requirements, for example with regard to providing redundancy. In contrast, if the inrush current limiter 250 is arranged between the decoupling device 200 and the power limiting device 300 (lower position in FIG. 5), there may be less stringent requirements with respect to the inrush current limiter 250, which may thereby be realized according to a simple embodiment.

Figure 6:
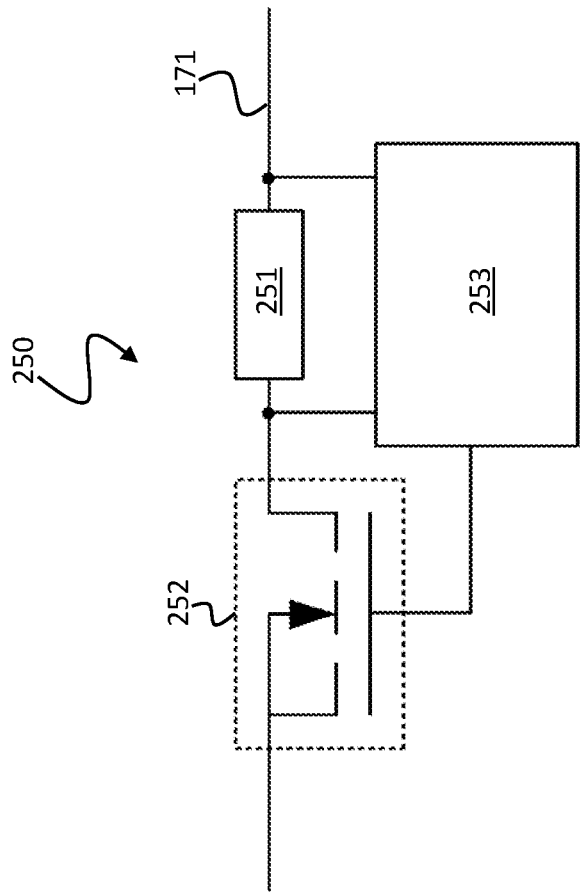
FIG. 6 shows an inrush current limiter of a field device.

FIG. 6 shows a possible embodied of the inrush current limiter 250. The inrush current limiter 250 comprises a resistor 251 and a transistor 252, which are connected in series with each other. The transistor 252 may be a self-blocking n-channel FET (field effect transistor). A further component of the inrush current limiter 250 is a closed-loop controller 253. The closed-loop controller 253 is configured to measure the current flowing across the resistor 251 and, depending on this, to control the voltage drop across the transistor 252 by appropriately driving the gate of the transistor 252 in such a way that an occurrence of an excessive current is avoided.

For the field devices 100 of the system 50, a design with a galvanic isolation may further be considered. For illustration purposes, FIG. 4 shows a possible embodiment of the first device section 101 of the field device 100 comprising a separating device 131, which is arranged between the decoupling device 200 and the power limiting device 300, and with the aid of which a galvanic isolation may be effected. In this way, the electrical energy supplied to the first device section 101 may be conducted on separate electrical circuits, which may promote reliable and safe operation of the system 50.

Figure 7:
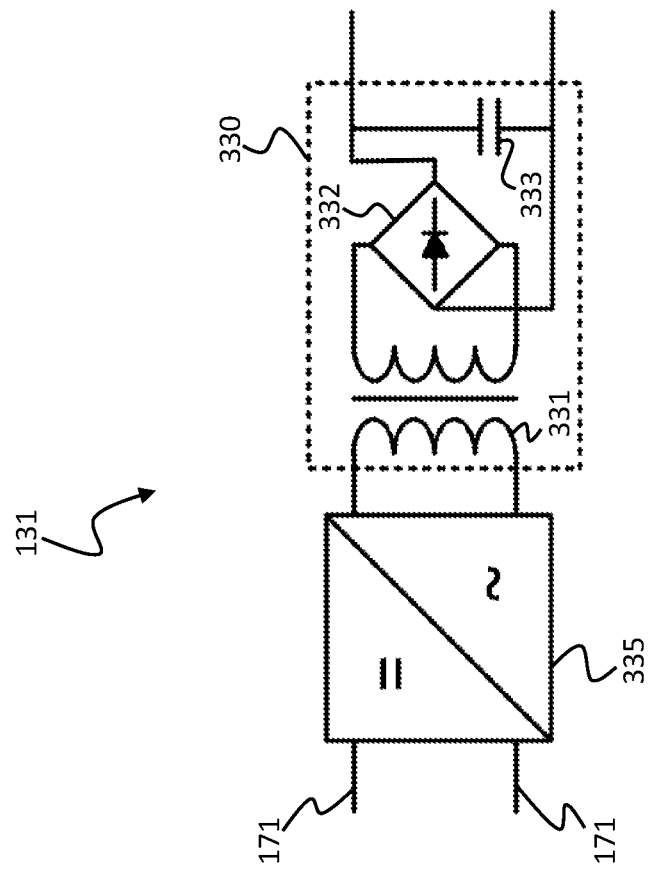
FIG. 7 shows a decoupling device of a field device.

FIG. 7 shows a possible embodiment of the separating device 131. The separating device 131 has an inverter 335 arranged on the input side and a separating assembly 330 arranged downstream of the inverter 335, which comprises a transformer 331 effecting the galvanic isolation and, arranged downstream of this, a rectifier 332 and a smoothing capacitor 333 connected in parallel to the rectifier 332. With the aid of the inverter 335, the electrical energy present as a direct current may be converted into an alternating current and supplied to the transformer 331. The alternating current output from the transformer 331 may be rectified and smoothed with the aid of the rectifier 332 and the smoothing capacitor 333, so that a direct current is again present on the output side of the separating device 131.

As indicated above, a galvanic isolation may also be formed in the feed-in device 400, for example in the feed-in device limiting device 403 (cf. FIG. 3). In this way, the field devices 100 may also be realized without galvanic isolation and thereby without the isolation device 131. In the case of an embodiment of the feed-in device 400 with a galvanic isolation, this may be realized according to the circuit diagram shown in FIG. 7.

The field device 100 shown in FIG. 4 or its first device section 101 further comprises an internal power supply device 132, which may be electrically supplied via the electrical energy supplied to the first device section 101. A current branch leading to the internal power supply device 132 and formed by internal electrical conductors 171 may be formed between the decoupling device 200 or the separating device 131 and the power limiting device 300, as shown in FIG. 4. The internal power supply device 132 may be used to supply electrical energy to internal devices of the field device 100, e.g. a communication controller 150 used within the framework of data communication and described further below.

With reference to the following FIGS. 8-11, possible embodiments of the power limiting device 300 of the field devices 100 connected to the terminal device 160 of the second device section 102 are described. In this context, it is pointed out that the illustrated circuit diagrams are to be regarded as principle circuit diagrams. In this respect, it is possible to replace components and devices shown in the individual circuit diagrams with other components and devices having the same effect and/or to provide a different embodiment or arrangement for components and devices shown.

Figure 8:
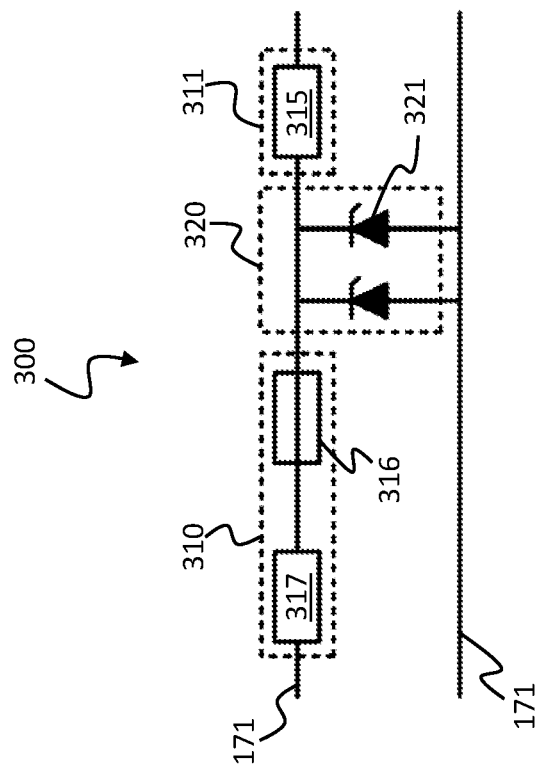
FIGS. 8-11 depict power limiting devices of a field device.

FIG. 8 shows a possible layout of the power limiting device 300 as it may be considered for the field device 100 shown in FIG. 4 (and thus all field devices 100 of the system 50). The power limiting device 300 may be used to cause current limiting and voltage limiting. The power limiting device 300 comprises a protective device 310 arranged on the input side, a voltage limiting device 320 arranged downstream of the protective device 310, and a first current limiting device 311 arranged on the output side downstream of the voltage limiting device 320. The protective device 310 which is connected in series with the first current limiting device 311 comprises an optional protective resistor 317 and a fuse 316 connected in series with the protective resistor 317. The protective resistor 317 may also be omitted.

The first current limiting device 311 comprises a resistor 315. The voltage limiting device 320, via which a conductor path comprising the protective device 310 and the first current limiting device 311 is connected to a further conductor path comprising only an internal electrical conductor 171 as shown in FIG. 8, comprises two voltage limiting components or semiconductor components connected in parallel to each other. In the present embodiment shown, these are two Zener diodes 321.

In the power limiting device 300 shown in FIG. 8, the resistor 315 of the first current limiting device 311 is used to effect current limiting. Via the fuse 316 and the optional protective resistor 317 of the protection device 310, protection of the voltage limiting device 320 or of its Zener diodes 321 may be achieved. With respect to voltage limiting, the Zener diodes 321 are operated in the reverse direction in the case of the power limiting device 300, so that the voltage applied to the two conductor paths is limited to a limit voltage specified by the Zener diodes 321. In the event that the voltage exceeds the limit, the Zener diodes 321 become conductive, allowing the excess voltage to be converted to heat.

Figure 9:
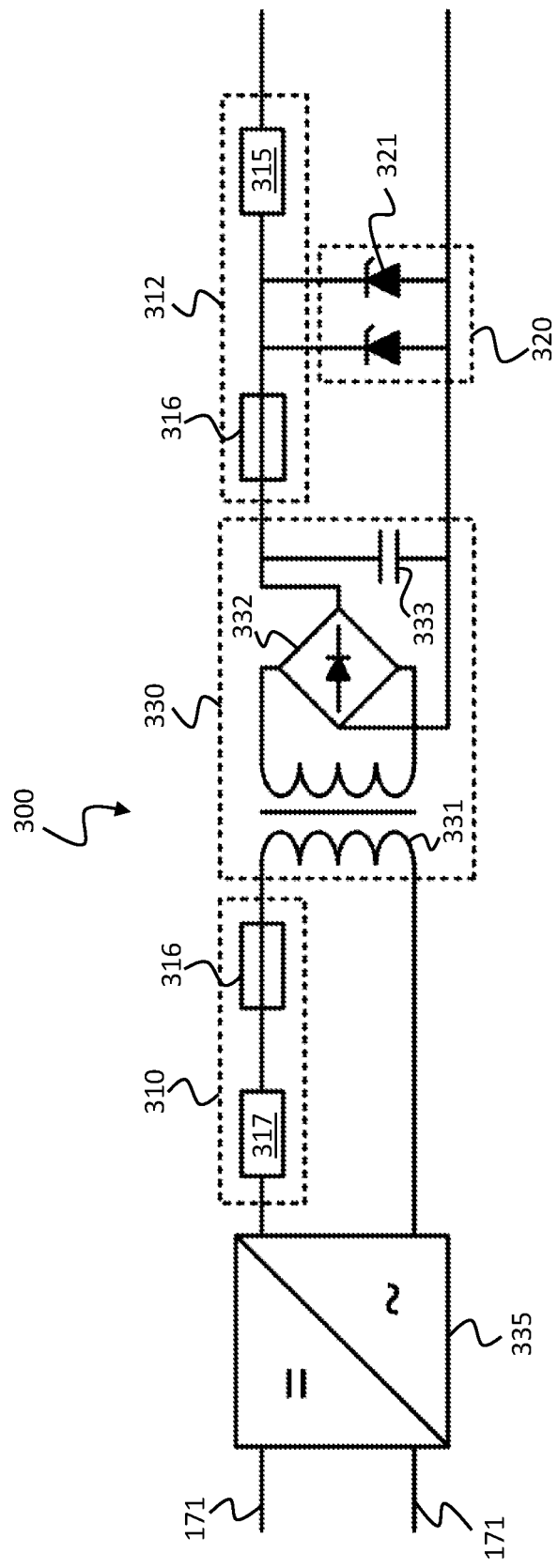

FIG. 9 shows a further embodiment of the power limiting device 300 as it may be used for the field device 100 shown in FIG. 4 (and thus all field devices 100 of the system 50). The power limiting device 300 is configured to effect current limiting and voltage limiting, and further comprises galvanic isolation. The embodiment shown in FIG. 9 comprises a combination of the circuit diagrams shown in FIGS. 7-8.

As shown in FIG. 9, the power limiting device 300 comprises an inverter 335 on the input side, followed in sequence by a protective device 310, a separating assembly 330, and a combination of a second current limiting device 312 and a voltage limiting device 320. The protective device 310 comprises the structure described above with reference to FIG. 8, with an optional protective resistor 317 and a fuse 316 connected in series therewith. The separating assembly 330 has the structure described above with reference to FIG. 7, with a transformer 331, a rectifier 332 connected thereto, and a smoothing capacitor 333 connected in parallel therewith.

The second current limiting device 312 comprises a fuse 316 and a resistor 315 connected in series with the fuse 316. The voltage limiting device 320 comprises, in accordance with the configuration shown in FIG. 8, two voltage limiting components connected in parallel, in this case again in the form of Zener diodes 321, via which a conductor path comprising the second current limiting device 312 is connected to a further conductor path. The Zener diodes 321 are connected to the conductor path comprising the second current limiting device 312 in a region between the fuse 316 and the resistor 315 of the second current limiting device 312.

In the power limiting device 300 shown in FIG. 9, the galvanic isolation is realized by the transformer 331 of the separating assembly 330. With the aid of the inverter 335, the electrical energy present as a direct current may be converted into an alternating current, and supplied to the transformer 331 via the protective device 310. The alternating current output from the transformer 331 may be rectified and smoothed with the aid of the rectifier 332 and the smoothing capacitor 333, wherein a direct current is present on the output side of the separating assembly 330, and thereby also on the output side of the power limiting device 300. The resistor 315 of the second current limiting device 312 is used to cause the current limiting. Via the fuse 316 and the optional protective resistor 317 of the protection device 310, protection of the transformer 331 may be achieved, and via the fuse 316 of the second current limiting device 312, protection of the voltage limiting device 320 may be achieved. The voltage limiting device 320, in which the Zener diodes 321 are operated in the reverse direction, is used to effect voltage limiting.

With the aid of the power limiting device 300 of the field device 100 shown in FIG. 4, a common current limiting and voltage limiting may be caused with respect to the output line terminals 165 of the terminal device 160. This may be achieved using the embodiments of the power limiting device 300 shown in FIG. 8-9. As shown in FIG. 4, the electrical energy transported through the power limiting device 300 may be further directed to the output line terminals 165 via the input/output controller 161 connected to the power limiting device 300 to electrically supply field components 600 via output lines 510 connected thereto (see FIGS. 1-2). To this end, the input/output controller 161 and/or the terminal device 160 may comprise a suitable embodiment having electrical conductors to direct electrical energy through the input/output controller 161 to the individual output line terminals 165. In an alternative embodiment, the electrical energy may be conducted past the input/output controller 161 or in parallel to the input/output controller 161 to the output line terminals 165 via appropriate electrical conductors.

For the power limiting device 300, further embodiments are conceivable with the aid of which a plurality of separate and possibly different current limitations and/or a plurality of separate and possibly different voltage limitations may be effected. In this way, separate and optionally different current limitations and/or voltage limitations may be present with respect to single or multiple output line terminals 165.

Figure 10:
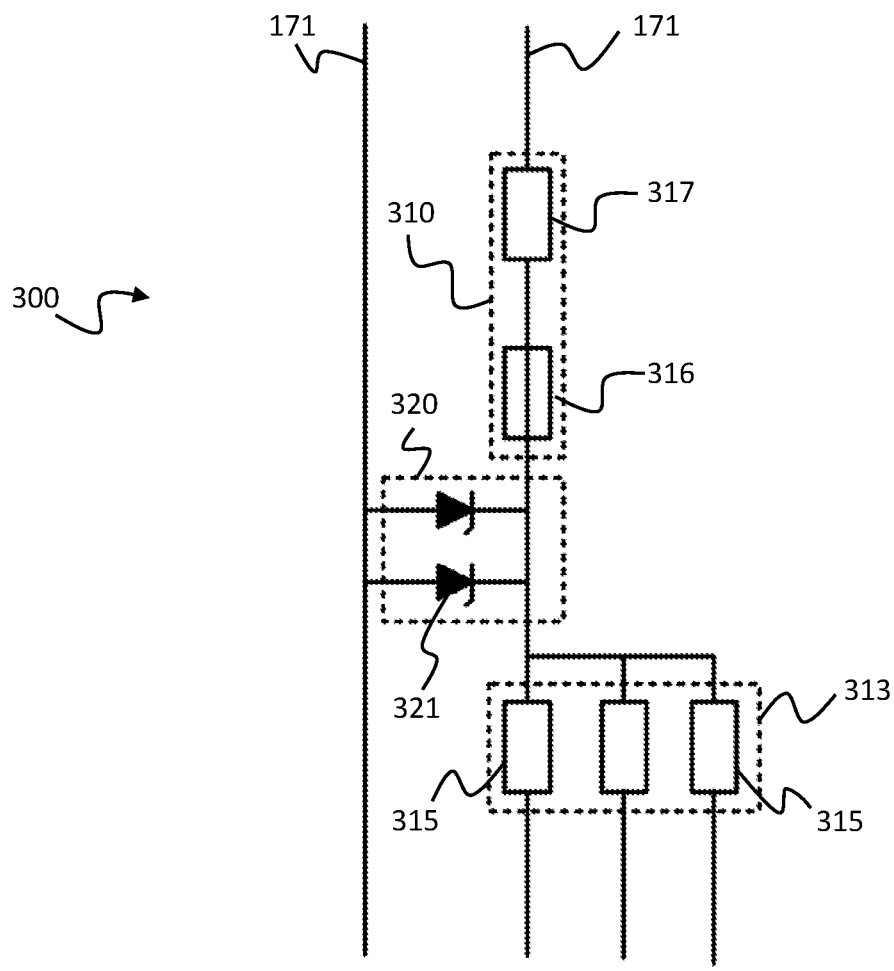

It is e.g. possible to embody the power limiting device 300 in such a way that, with respect to the output line terminals 165, there is a common voltage limitation and a plurality of small-partitioned or subdivided current limitations. By way of illustration, FIG. 10 shows a further possible embodiment of the power limiting device 300 as it is conceivable for the field device 100 shown in FIG. 4 (and thus all field devices 100 of the system 50). The power limiting device 300 has a protective device 310 on the input side, which is followed by a voltage limiting device 320 and a third current limiting device 313.

The protective device 310 comprises the structure described above with reference to FIG. 8, with an optional protective resistor 317 and a fuse 316 connected in series therewith. In accordance with the configuration shown in FIG. 8, the voltage-limiting device 320 comprises two voltage-limiting components, in this case again in the form of Zener diodes 321, via which a conductor path comprising the protective device 310 is connected to a further conductor path. With reference to the third current-limiting device 313, which comprises a plurality of resistors 315 connected in parallel, a division or subdivision of the conductor path comprising the protective device 310 into a plurality of further conductor paths is embodied, which each comprise a resistor 315 of the third current-limiting device 313, and which are each provided for connection to one or a plurality of output conduction connections 165 of the terminal device 160.

In the power limiting device 300 shown in FIG. 10, the resistors 315 of the third current limiting device 313 serve to effect current limiting, and the reverse-biased Zener diodes 321 of the voltage limiting device 320 serve to effect voltage limiting. Via the fuse 316 and the optional protective resistor 317 of the protective device 310, the voltage limiting device 320 may be protected. Via the split third current limiting device 313, separate and, if different sized resistors 315 are used with the third current limiting device 313, also different current limitations may be caused with respect to single and/or multiple output line terminals 165 or groups of output line terminals 165.

With reference to the power limiting device 300 shown in FIG. 10, it is possible to also embody this with an additional galvanic isolation. For this purpose, analogous to the embodiment shown in FIG. 9, additional components such as an inverter 335 and a separating assembly 330 may be used. Here, the inverter 335 may be arranged upstream of the protective device 310, and the separating assembly 330 may be arranged between the protective device 310 and the voltage limiting device 320. The voltage limiting device 320 may further be preceded by a fuse 316.

As indicated above, the power limiting device 300 of the field devices 100 may also be configured in such a way that, in addition to current limiting (i.e., a shared current limiting device or a plurality of separate current limiting devices), a plurality of separate and optionally different voltage limiting devices may be caused with respect to individual or a plurality of output line terminals 165. For this purpose, the power limiting device 300 may comprise a plurality of divided or split conductor paths and a plurality of voltage limiting devices 320, optionally effecting different voltage limiting, via each of which two conductor paths are connected. In a corresponding manner, it is possible to provide additional galvanic isolation, for example using components shown in FIG. 9.

Figure 11:
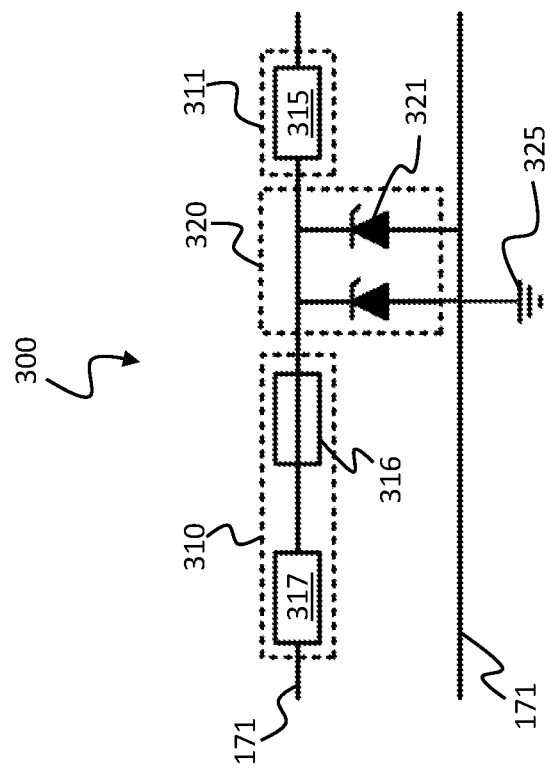

Reference is also made to the possibility of not providing galvanic isolation for either the field devices 100 or the feed-in device 400 of the system 50. In such a case, the field devices 100 may be configured with a ground connection to allow for safe operation. The ground connection may be provided in the area of the power limiting device 300. By way of illustration, FIG. 11 shows a further design of the power limiting device 300 as it may be used for the field device 100 shown in FIG. 4 (and thus all field devices 100 of the system 50). The power limiting device 300 of FIG. 11 is substantially the same as the embodiment shown in FIG. 8, and additionally comprises a ground connection 325 on an internal electrical conductor 171 or conductive path. If a power limiting device 300 with a structure according to FIG. 10 or another structure is used, a corresponding ground connection 325 may also be embodied here.

As indicated above, in addition to providing energy to the field devices 100 and the field components 600 connected thereto, the system 50 is also used to perform data communication, e.g. to transmit control data or control signals that may be output by the superordinate controller 700 to actuators, and to receive sensor data or sensor signals from sensors and transmit them to the controller 700.

For this purpose, the field devices 100 may have a structure and components as illustrated in FIG. 4 for one of the field devices 100. Here, the first device section 101 comprises a first communication terminal 120, a second communication terminal 121, and a communication controller 150. The communication controller 150 may be monolithic or discrete. Data signals may be transmitted and received via the first communication terminal 120, as well as via the second communication terminal 121. The first communication terminal 120 is connected to the communication controller 150 via a first barrier circuit 140, a first physical interface 145, and internal data lines 176 of the field device 100. The second communication terminal 121 is connected to the communication controller 150 via a second barrier circuit 141, a second physical interface 146, and internal data lines 176 of the field device 100. This allows the communication controller 150 to transmit and receive data signals via both the first communication terminal 120 and the second communication terminal 121.

The internal data lines 176 of the field device 100 may comprise a plurality of electrical conductors, for example in the form of conductor paths. The first and second barrier circuits 140, 141 are configured to limit an electrical power transmittable to the first and second communication terminals 120, 121, respectively, of the first device section 101 in the course of data communication and/or to cause galvanic isolation. As a result, an occurrence of a spark or ignition spark with sufficient energy for ignition in the area of the communication terminals 120, 121 due to the data communication may be avoided. In this way, a high level of safety may be achieved with respect to data communication, which makes it possible to place the field devices 100 in zone 1/21 of the ATEX directive (second zone 11 according to FIG. 2) with respect to the application scenario shown in FIG. 2.

For the purpose of power limitation, the first and second barrier circuits 140, 141 may comprise electrical components such as at least one diode and at least one resistor. A galvanic isolation may be realized with the aid of an embodiment of the first and second barrier circuits 140, 141 comprising a transformer or a capacitor. The first and second physical interfaces 145, 146, which may be embodied as physical interface modules, are used for processing, i.e., encoding and decoding, respectively, data signals. As the case may be, the first and second physical interfaces 145, 146 may each have an additional energy-limiting barrier circuit.

FIG. 4 further shows that the input terminal 110 is realized in the form of a hybrid connection which comprises the first communication terminal 120. In a corresponding manner, the output terminal 111 is realized in the form of another hybrid connection which comprises the second communication terminal 121. In this embodiment, the input terminal 110 and the output terminal 111 may be used both to supply or transmit electrical energy for energy supply and to transmit data signals. In a corresponding manner, the supply lines 500 connected to the input terminal 110 and output terminal 111 (cf. FIG. 1) may simultaneously function as data lines via which electrical energy for energy supply and data signals may be transmitted. Matched to this, the supply lines 500 may have corresponding electrical conductors or wires for data transmission, and the connectors provided at the ends of the supply lines 500 may have communication connectors corresponding to the communication terminals 120, 121. As a result, it is possible to keep the wiring complexity of the system 50 low.

The field devices 100 of the system 50 or their communication controller 150 may receive and transmit data signals via the input terminal 110 and the output terminal 111. In this way, data communication is possible between the field devices 100 among themselves and between the field devices 100 and the feed-in device 400. The latter may take place via the first field device 100-1 of the system 50, which is connected to the feed-in device 400 via a supply line 500 connected to the input terminal 110, as shown in FIG. 1.

FIG. 4 further shows that the communication controller 150 of the first device section 101 is connected to the terminal device 160 of the second device section 102 or to the input/output controller 161 via a communication connection 175. As a result, the communication controller 150 may receive and transmit data signals via the terminal device 160. In this way, data communication is possible between the communication controller 150 and field components 600, which may be connected to output line terminals 165 of the terminal device 160 via output lines 510 (cf. FIG. 1). The data communication may be carried out via the input/output controller 161 of the terminal device 160.

As shown in FIG. 4, in addition to corresponding internal data lines of the field device 100, which may comprise electrical conductors in the form of conductor paths, the communication connection 175 comprises a barrier device 155. The barrier device 155 is configured to cause a limitation of an electrical power transmittable from the communication controller 150 to the terminal device 160 during a data communication and/or a galvanic isolation.

The use of the barrier device 155 in the field devices 100 of the system 50 also serves to provide a high level of security with respect to the data communication. With the aid of the barrier device 155, a limitation of the electrical power which may be introduced into the second device sections 102 of the field devices 100 in the course of the data communication may be achieved. This may ensure that, as a result of the data communication, no spark or ignition spark with sufficient energy for ignition may be caused in the region of the terminal devices 160 or output line terminals 165 of the second device sections 102 of the field devices 100, the output lines 510 and the field components 600 connected to the field devices 100 via the output lines 510. As a result, the field components 600 may be located in zone 0/20 of the ATEX directive (first area 10 according to FIG. 2), and the field devices may be located in zone 1/21 of the ATEX directive (second area 11 according to FIG. 2), according to the application scenario illustrated in FIG. 2.

The barrier device 155 of the communication connection 175 may be in the form of a digital isolator such as an optocoupler or a magnetic coupler. In such an embodiment, the barrier device 155 may provide reliable and safe power limiting together with galvanic isolation.

The input/output controller 161 shown in FIG. 4, through which the communication controller 150 may communicate with field components 600, may be configured to control the transmission and reception of data signals via the terminal device 160 or via its output line terminals 165. Such data signals may be previously received by the input/output controller from the communication controller 150 via the communication connection 175, or subsequently forwarded to the communication controller 150.

Here, data signals (e.g. control data) coming from the communication controller 150 and received by the input/output controller 161 may be further sent to field components 600 (e.g. actuators) using the input/output controller 161. Furthermore, data signals (e.g. sensor data) coming from field components 600 (e.g. sensors) and received by the input/output controller 161 may be further sent to the communication controller 150 using the input/output controller 161. If necessary, the input/output controller 161 may also convert or process the data signals received in each case before they are sent on.

The input/output controller 161 may further be configured to control a forwarding of electrical energy to field components 600 via the output line terminals 165 performed as part of the electrical energy supply. In this way, the distribution of electrical energy via the terminal device 160 may be flexibly determined. This may e.g. be controlled by the communication controller 150, which may transmit appropriate data signals or control data to the input/output controller 161 for this purpose. Such control data may be generated by the superordinate controller 700 of the system 50, or may be based on control data generated by the controller 700. In the aforementioned case of use, communication between the communication controller 150 and the input/output controller 161 may e.g. take place according to a predetermined communication protocol, as well as via interfaces of the communication controller 150 and the input/output controller 161.

Also, the control of the switching device 180 shown in FIG. 4 for forwarding the electrical energy via the output terminal 111 of the field device 100 may e.g. be carried out with the aid of the communication controller 150. This may also be based on control data generated by the superordinate controller 700, which may be received by the communication controller 150.

The feed-in device 400 of the system 50 is comprised as part of the data communication, as indicated above. For this purpose, the setup for the feed-in device 400 shown in FIG. 3 may be used. Here, the feed-in device 400 comprises a communication input 405. Via the communication input 405 which may be realized in the form of a connector of the feed-in device 400 the feed-in device 400 may be connected to the superordinate controller 700 of the system 50. In this manner, the feed-in device 400 may receive data signals from the controller 700 and transmit them to the controller 700.

The feed-in device 400 further comprises a feed-in device communication terminal 425 via which data signals may be transmitted and received, and via which the feed-in device 400 may communicate with the field devices 100, i.e. with the first field device 100-1 and via the latter with the other field devices 100 (cf. FIG. 1). A further component of the feed-in device 400 is a feed-in device communication controller 450, which is connected to the communication input 405 via a first physical feed-in device interface 445 and internal data lines 476 of the feed-in device 400. Furthermore, the feed-in communication controller 450 is connected to the feed-in device communication terminal 425 via a second physical feed-in device interface 446, a feed-in device barrier circuit 430, and internal data lines 476. In this manner, the feed-in communication controller 450 may transmit and receive data signals via the communication input 405 and via the feed-in device communication terminal 425.

The first and second physical feed-in device interfaces 445, 446 are configured to encode and decode data signals, respectively. The feed-in device barrier circuit 430 is configured to limit an electrical power that may be transmitted to the feed-in device communication terminal 425 in the course of data communication and/or to cause galvanic isolation. This may further promote safe performance of the data communication. The feed-in device barrier circuit 430 may comprise components such as at least one diode and at least one resistor for power limiting and/or a transformer or capacitor for galvanic isolation.

According to the field devices 100, the feed-in device output terminal 420 is implemented in the form of a hybrid connection that comprises the feed-in device communication terminal 425. Therefore, the feed-in device output terminal 420 may be used to transmit electrical energy and data signals. Furthermore, a supply line 500 configured in the form of a hybrid line may be connected to the feed-in device output terminal 420, which may comprise a connector having a communication connection corresponding to the feed-in device communication connection 425. As a result, the feed-in device 400 may be connected to one of the field devices 100 (or, according to FIG. 1, to the first field device 100-1) to allow for transmission of electrical energy and exchange of data signals.

The structure of the feed-in device 400 shown in FIG. 3 makes it possible to carry out data communication between the feed-in device 400 and the controller 700, as well as between the feed-in device 400 and the field devices 100 (via the first field device 100-1, cf. FIG. 1). The field devices 100 may also communicate with one another, as well as with the field components 600 connected thereto. In this way, data communication is possible between the controller 700 and the field components 600 via the feed-in device 400 and the field devices 100.

In the following, further possible variants and embodiments are described which may be considered with respect to components of the system 50 such as the field devices 100. Equivalent features and details, as well as components that are the same and have the same effect, are not described again in detail. Instead, reference is made to the above description for details thereof. Furthermore, aspects and details mentioned with respect to one embodiment may also be applied with respect to another embodiment, and features of two or more embodiments may be combined.

With respect to the field devices 100 of the system 50, different embodiments from FIG. 4 may be considered with a different number of connections used to connect supply lines 500.

Figure 12:
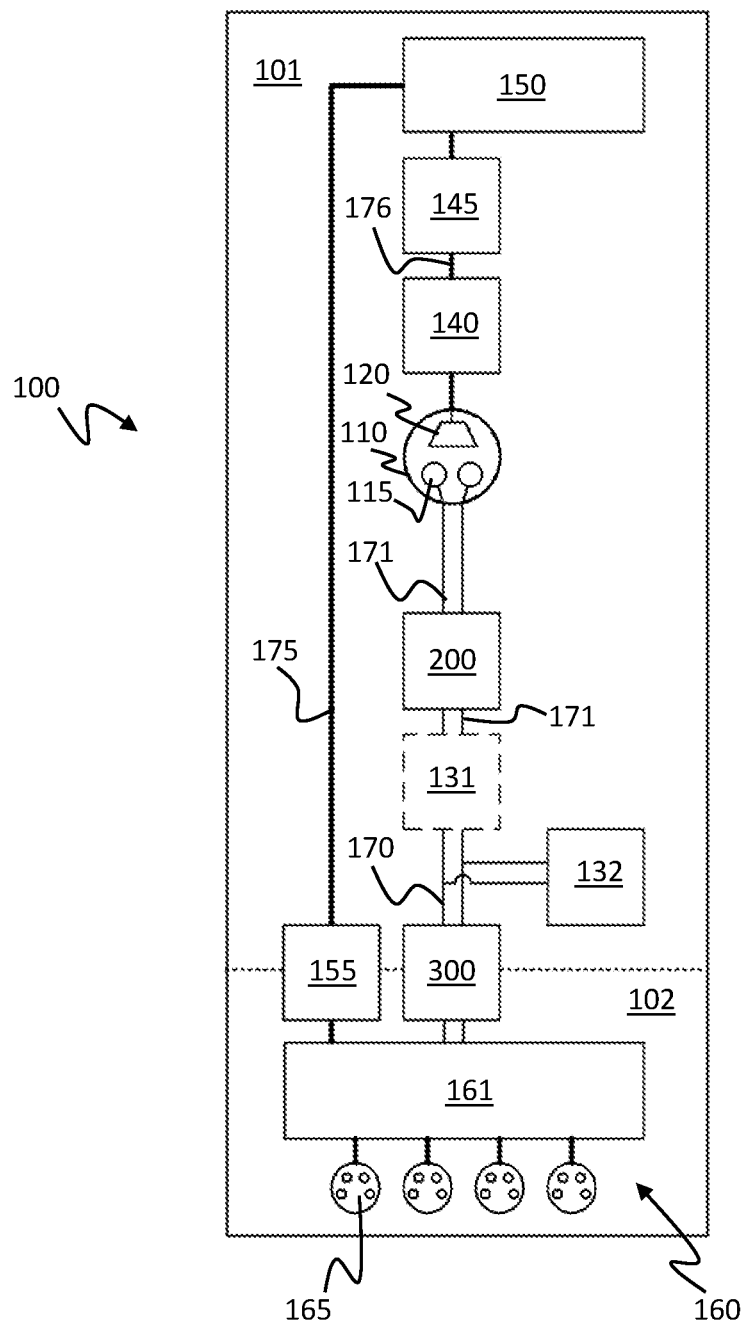
FIG. 12 is a depiction of a field device in which the field device comprises an input terminal.

By way of illustration, FIG. 12 shows an illustration of a field device 100 according to a second embodiment. Unlike the embodiment illustrated in FIG. 4, the field device 100 illustrated in FIG. 12 does not have an output terminal 111. Accordingly, components such as the switching device 180, the second communication connection 121, the second barrier circuit 141 and the second physical interface 146 are missing, as well. The input terminal 110 of the field device 100 of FIG. 12 may be used, in accordance with the embodiment of FIG. 4, for feeding electrical energy into the field device 100 or into its first device section 101 and for data communication.

The field device 100 shown in FIG. 12 may serve as a terminal device, and may be used, for example, at the end of a series or string of field devices 100 in order to forward the energy supplied to the field device 100 only to field components 600, and to carry out data communication via the field device 100 with the field components 600. In this respect, for example, for the third field device 100-3 shown in FIG. 1, an embodiment according to FIG. 12 may be used.

Figure 13:
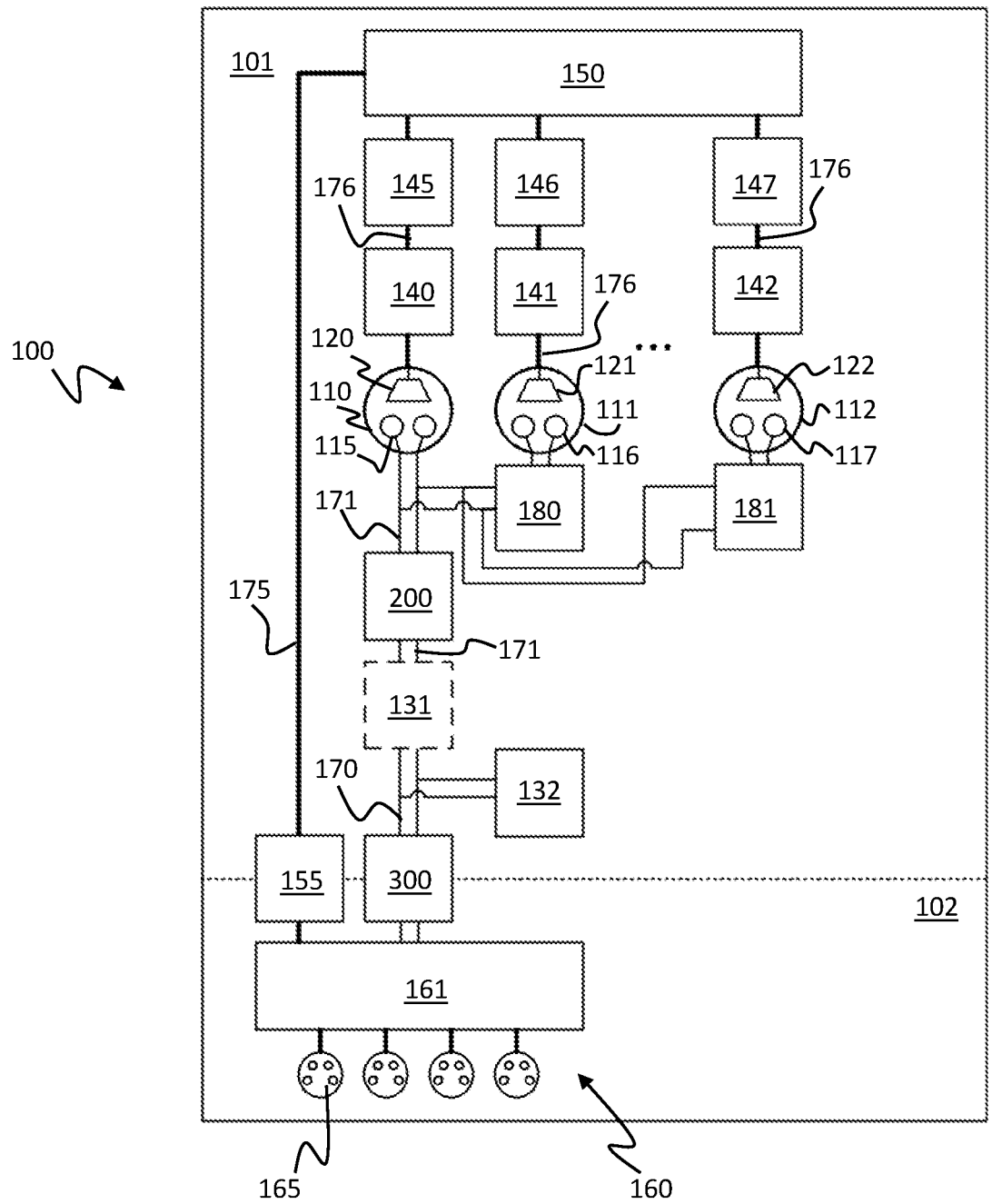
FIG. 13 is a depiction of a field device in which the field device comprises an input terminal and a plurality of output terminals.

FIG. 13 shows a depiction of a field device 100 according to a third embodiment. In contrast to the embodiment shown in FIG. 4, the field device 100 shown in FIG. 13 comprises (at least) one further output terminal 112. The further output terminal 112 is embodied as a hybrid connection corresponding to the output terminal 111 and, in addition to terminal contacts 117 used in the context of the electrical energy supply, comprises a further communication connection 122. The further communication connection 122 is connected to the communication controller 150 via a further barrier circuit 142, a further physical interface 147 and internal data lines 176 of the field device 100. In this way, the communication controller 150 may also transmit and receive data signals via the further communication connection 122. Corresponding to the first and second barrier circuits 140, 141, the further barrier circuit 142 is configured to limit an electrical power transmittable to the further communication connection 122 of the first device section 101 in the course of data communication and/or to cause a galvanic isolation. The further physical interface 147 is used for processing, i.e. encoding or decoding, data signals.

The field device 100 shown in FIG. 13 may be connected to two further field devices 100 via the first output terminal 111 and the further output terminal 112, as well as using two supply lines 500 connected thereto. Via both output terminals 111, 112 and the corresponding supply lines 500, electrical energy may be forwarded and data communication may take place. In this context, the field device 100 shown in FIG. 13 may be used as a distributor for energy supply and data communication.

Using one or a plurality of field devices 100 with an embodiment according to FIG. 13 and a plurality of field devices 100 with an embodiment according to FIG. 4, a system 50 with a plurality of branched rows or strings of field devices 100 may thus be constructed. At the end of such a string, a field device 100 with an embodiment according to FIG. 12 may be used.

In the embodiment shown in FIG. 13, the first device section 101 further comprises a further switching device 181. Via the further switching device 181 and internal electrical conductors 171 of the field device 100, the input terminal 110 and the further output terminal 112 of the field device 100 are connected to each other. In this way, the forwarding of electrical energy via the further output terminal 112 may be controlled.

With reference to the field device 100 shown in FIG. 13, it is possible to provide a plurality of further output terminals 112 each having a further communication connection 122, and correspondingly a plurality of further barrier circuits 142 and physical interfaces 147 for respectively connecting the further communication connections 122 to the communication controller 150, as indicated in FIG. 13 by dots in an area between the barrier circuits 141, 142. In a corresponding manner, a plurality of further switching devices 181 may be provided through each of which the input terminal 110 and a respective further output terminal 122 are connected to control the forwarding of electrical energy.

With respect to data communication, it is possible to further provide the following embodiment with respect to the field devices 100 described with reference to FIGS. 4, 12, and 13. The field devices 100 may be configured to carry out data communication via the communication terminals 120, 121, 122 and the physical interfaces 145, 146, 147 of the first device section 101 according to a first communication protocol, and to carry out data communication via the terminal device 160 of the second device section 102 according to a second communication protocol differing from the first communication protocol. For this purpose, the terminal device 160 or the input/output controller 161 may have corresponding interfaces or physical interfaces.

In this way, the data communication between the field devices 100 and the field components 600 may be decoupled from the rest of the data communication, which may comprise the data exchange between the field devices 100 among one another and between the field devices 100 and the superordinate controller 700 via the feed-in device 400. This e.g. allows for a different embodiment with respect to different requirements. For example, data communication between the field devices 100 and the field components 600 may be at a lower data transmission rate than other data communication.

The first communication protocol may e.g. refer to an Ethernet communication with a data transfer rate of e.g. 100 MBit, such as EtherCAT. The second communication protocol may e.g. refer to a communication according to HART or Profibus PA. Furthermore, the second communication protocol may also refer to an Ethernet communication, wherein, in contrast to the first Ethernet communication protocol, a smaller data transmission rate of e.g. 10 MBit is used. In this context, internal components of the terminal device 160 or the input/output controller 161 used for data communication may be embodied according to the future APL (Advanced Physical Layer) standard, as the case may be.

With respect to the application scenario illustrated in FIG. 2, the following features may further apply to the field devices 100 of the system 50. The connections of the first device section 101 of the field devices 100, i.e. the input terminal 110 and, if present, the output terminal(s) 111, 112, may be embodied according to a first type of ignition protection, and the output line terminals 165 of the second device section 102 of the field devices 100 may be embodied according to a second type of ignition protection, wherein the second type of ignition protection corresponds to a higher level of protection than the first type of ignition protection. The second ignition protection type may be the Intrinsic Safety Ex ia ignition protection type, and the first ignition protection type may be the Intrinsic Safety Ex ib ignition protection type.

In order to fulfill the different ignition protection types, components such as internal components and electrical conductors present in the area of the respective connections 110, 111, 112, 165 of the first and second device sections 101, 102 may comprise embodiments that are sufficient for the ignition protection types, for example with regard to distances and redundancies. In the case of the circuit diagrams shown in FIGS. 5, 8, 9, 10 and 11, redundant embodiments are also present which may contribute to the ignition protection types or to the Intrinsic Safety Ex ib and Ex ia of the connections 110, 111, 112, 165. In this context, the further assembly 210 comprises two diodes 211, the capacitive assembly 240 comprises two capacitors 241, the clamping circuit 220 comprises two strings of diodes 211, and the voltage limiting device 320 comprises two Zener diodes 321. The monitoring of the energy supply to the field devices 100 realized with the aid of the feed-in device 400 may also contribute to the Intrinsic Safety Ex ib of the connections 110, 111, 112 of the first device section 101. With reference to the output line terminals 165 of the second device section 102, the power limitation achievable with the aid of the power limiting device 300 and barrier device 155 may contribute to the Intrinsic Safety Ex ia.

In order to achieve a high level of safety of the system 50, the field devices 100 may further be embodied, for example, with a cast enclosure (protection type Ex mb). In this embodiment, the field devices 100 or their housing may be filled with a casting compound, which may prevent the penetration of an explosive mixture into the field devices 100. It is also possible to embody parts of the field devices 100 according to increased safety (protection class Ex eb). Another type of protection for the field devices 100 is also conceivable, for example an embodiment with a flameproof enclosure (type of protection Ex db).

Also for the feed-in device 400, a cast enclosure (protection type Ex mb) or a flameproof enclosure (protection type Ex db), and a partial embodiment according to increased safety (protection type Ex eb) may be considered.

The field components 600 may be intrinsically safe field components, and may be embodied according to the Intrinsic Safety Ex ia type of protection.

Figure 14:
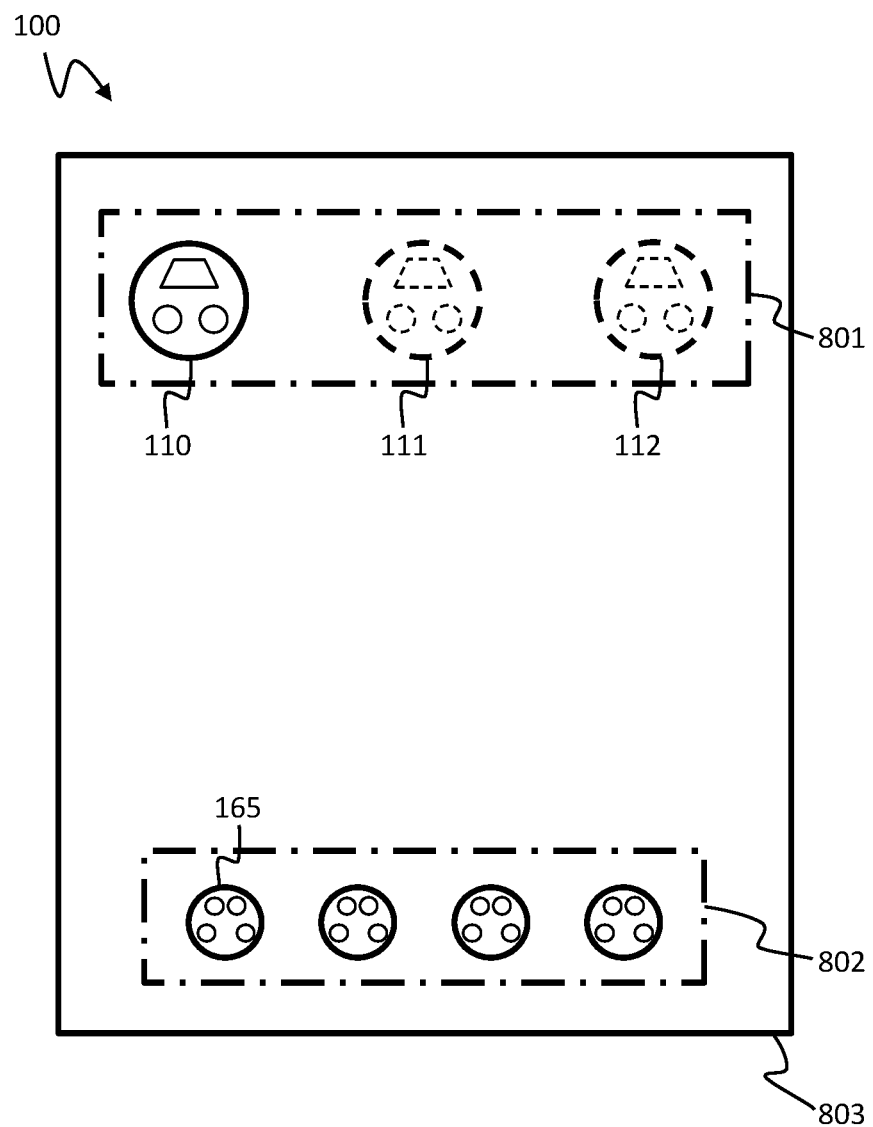
FIG. 14 is a further depiction of a field device which, from the explosion protection point of view, comprises three device sections.

With reference to the field devices 100 of the system 50, the following is additionally noted. The structure of the field devices 100 described above with a first device section 101 and a second device section 102 may refer to a circuit view of the field devices 100. From an explosion protection point of view, the field devices 100 may also be associated with three sections, which will be referred to below as first device section 801, second device section 802 and third device section 803. As indicated in FIG. 14 with reference to a field device 100, the first device section 801 comprises the input terminal 110, and, depending on the embodiment of the field device 100, one or a plurality of output terminals 111, 112. The second device section 802 comprises the output line terminals 165 of the field device 100. The third device section 803, which relates to the field device 100 as such, comprises components such as the circuit or circuit components of the field device 100 connected to the respective connections 110, 111, 112, 165.

The first device section 801 may be of a first type of ignition protection, the second device section 802 may be of a second type of ignition protection, and the third device section 803 may be of a third type of ignition protection. The first, second, and third ignition protection types may differ from one another. As indicated above, the field devices 100 or their connections 110, 111, 112, 165 may be embodied in such a way that the first type of ignition protection is the intrinsically safe Ex ib type of ignition protection, and that the second type of ignition protection is the intrinsically safe Ex ia type of ignition protection.

Monitoring of the energy supply to the field devices 100 by the feed-in device 400 may also contribute to the Intrinsic Safety Ex ib of the first device section 801. The power limitation achievable within the field devices 100 with the aid of the power limiting device 300 and the barrier device 155 may contribute to the Intrinsic Safety Ex is of the second device section 802. With respect to the third device section 803 and the third type of ignition protection, it is possible to embody the field devices 100 with a cast enclosure or with an equivalent embodiment such as a flameproof enclosure, so that the third type of ignition protection may be Ex mb or Ex db.

In addition to the embodiments described above and illustrated in the FIGS., further embodiments are conceivable, which may comprise further variations and/or combinations of features.

For example, a possible variation is to embody the field devices 100 illustrated in FIGS. 4 and 13 without a switching device 180, 181. In this way, an input terminal 110 may be connected to an output terminal 111, 112 only via internal electrical conductors 171, and the forwarding of electrical energy via the output terminal 111, 112 may not be controlled.

With reference to connections shown in the FIGS., such as the input terminals 110 and output terminals 111, 112 of the field devices 100 and the feed-in device output terminal 420 of the feed-in device 400, it is possible that these connections have an additional ground contact in addition to two terminal contacts 115, 116, 117, 421.

For voltage limiting purposes, other components or semiconductor components suitable for voltage limiting, such as thyristors, may be used in a power limiting device 300 (cf. FIGS. 8, 9, 10, 11) instead of Zener diodes 321.

With regard to the decoupling device 200 shown in FIG. 5, it is possible to replace the diodes 211 of the further assembly 210 and/or the clamping circuit 220 with other components or semiconductor components.

With reference to the feed-in device 400 shown in FIG. 3, it is noted that a structure corresponding to the circuit diagram shown in FIG. 8 or 9 may be used for the feed-in device limiting device 403 shown in FIG. 3 and used for energy limiting.

With regard to the feed-in device 400, it is also possible to arrange it in zone 1/21 in accordance with the ATEX directive (second area 11 in FIG. 2) in deviation from FIG. 2. The feed-in device 400 may be configured to correspond to this. Furthermore, measures such as the use of an explosion-proof plug connector on a supply line used for connection to the energy supply input 401 of the feed-in device 400 may be used, via which the feed-in device 400 may be connected to a current source.

In the field devices 100 described above and shown in FIGS. 1, 4, 12 and 13, data communication between the field devices 100 and with the feed-in device 400 is implemented in the form of a point-to-point connection. The field devices 100 and the feed-in device 400 may also be implemented in such a way that data communication may also take place via a bus structure.

In a further embodiment, the field devices 100 and the feed-in device 400 may be configured such that the electrical energy supply and data communication are not carried out with the aid of hybrid lines and hybrid connections, but instead are carried out via separate supply lines and data lines, and separate connections for the energy supply and data communication.

In a further modification, a feed-in device 400 may be used, which is embodied for the electrical energy supply of field devices 100 and monitoring of the electrical energy supply, but not for data communication, and therefore does not serve as a communication interface between the field devices 100 and the superordinate controller 700. Here, the field devices 100 or one of the field devices 100 may be appropriately connected to the controller 700 to allow for data communication with the controller 700.

For this purpose, e.g. an additional device may be used which is connected to the controller 700. The additional device may be connected to the feed-in device 400 via a supply line embodied only for the electrical energy supply, and to one of the field devices 100 via a supply line embodied as a hybrid line. In this case, the additional device may be used to combine the electrical energy supply and the data communication. Via the additional device, the electrical energy provided by the feed-in device 400 may be transmitted to the field devices 100, and the data communication may take place between the controller 700 and the field devices 100. The field devices 100 may also be interconnected via supply lines configured as hybrid lines.

Although the invention has been further illustrated and described in detail by preferred embodiments, the invention is not limited by the disclosed examples and other variations may be derived therefrom by those skilled in the art without departing from the protective scope of the invention.

TABLE 1

List of reference numerals 10-253

| | |
|---|---|
| 10 | first area |
| 11 | second area |
| 12 | third area |
| 50 | system |
| 100 | field device |
| 101 | first device section |
| 102 | second device section |
| 110 | input terminal |
| 111 | output terminal |
| 112 | further output terminal |

TABLE 1-continued

List of reference numerals 10-253

| | |
|---|---|
| 115 | terminal contact |
| 116 | terminal contact |
| 117 | terminal contact |
| 120 | first communication terminal |
| 121 | second communication terminal |
| 122 | further communication terminal |
| 131 | separating device |
| 132 | internal power supply device |
| 140 | first barrier circuit |
| 141 | second barrier circuit |
| 142 | further barrier circuit |
| 145 | first physical interface |
| 146 | second physical interface |
| 147 | further physical interface |
| 150 | communication controller |
| 155 | barrier device |
| 160 | terminal device |
| 161 | input/output controller |
| 165 | output line terminal |
| 170 | energy supply connection |
| 171 | internal conductor |
| 175 | communication connection |
| 180 | switching device |
| 181 | further switching device |
| 200 | decoupling device |
| 210 | further assembly |
| 211 | diode |
| 220 | clamping circuit |
| 230 | inductor |
| 240 | capacitive assembly |
| 241 | capacitor |
| 250 | inrush current limiter |
| 251 | resistor |
| 252 | transistor |
| 253 | controller |

TABLE 2

List of reference numerals 300-803

| | |
|---|---|
| 300 | power limiting device |
| 310 | protective device |
| 311 | first current limiting device |
| 312 | second current limiting device |
| 313 | third current limiting device |
| 315 | resistor |
| 316 | fuse |
| 317 | protective resistor |
| 320 | voltage limiting device |
| 321 | Zener diode |
| 325 | ground connection |
| 330 | separating assembly |
| 331 | transformer |
| 332 | rectifier |
| 333 | smoothing capacitor |
| 335 | inverter |
| 400 | feed-in device |
| 401 | current supply input |
| 403 | feed-in device limiting device |
| 405 | communication input |
| 410 | monitoring device |
| 412 | second detector |
| 413 | feed-in device switching device |
| 411 | first detector |
| 414 | control unit |
| 420 | feed-in device output terminal |
| 421 | terminal contact |
| 425 | feed-in device communication terminal |
| 430 | feed-in device barrier circuit |
| 445 | first physical feed-in device interface |
| 446 | second physical feed-in device interface |
| 450 | feed-in device communication controller |
| 471 | internal conductor |
| 476 | internal data line |
| 500 | supply line |

TABLE 2-continued

List of reference numerals 300-803

| | |
|---|---|
| 510 | output line |
| 600 | field component |
| 700 | controller |
| 801 | first device section |
| 802 | second device section |
| 803 | third device section |

The invention claimed is:

1. A system comprising:
a feed-in device, and
a plurality of field devices electrically connected to the feed-in device;
wherein the feed-in device is configured to provide an electrical energy for electrical energy supply to the field devices,
wherein the feed-in device comprises a monitoring device which is configured to detect spark generation in the electrical energy supply and, based on this, to switch off the electrical energy supply,
wherein the field devices each comprise a first device section having an input terminal for connecting a supply line, and a second device section,
wherein the electrical energy provided by the feed-in device is supplied to the first device section via the input terminal and transmittable from the first device section to the second device section via an electrical energy supply connection,
wherein the second device section comprises a terminal device having at least one output line terminal for connecting at least one output line to forward the electrical energy transmitted to the second device section, and
wherein the electrical energy supply connection of the first and second device sections comprises a power limiting device configured to cause a limitation of an electrical power transmittable from the first device section to the second device section in the course of the energy transmission.

2. The system according to claim 1, wherein the power limiting device of the field devices is configured to cause current limiting and voltage limiting.

3. The system according to claim 1, wherein the first device section of the field devices comprises a decoupling device configured to provide a predetermined input impedance for detecting the spark generation.

4. The system according to claim 1, wherein the first device section of the field devices comprises an internal power supply device, which is configured to be electrically supplied via the electrical energy supplied to the first device section.

5. The system according to claim 1, wherein the first device section of at least one field device comprises at least one output terminal for connecting a further supply line to forward the electrical energy supplied to the first device section.

6. The system according to claim 5, wherein the first device section of the at least one field device comprises a switching device arranged between the input terminal and the at least one output terminal, with the aid of which the forwarding of the electrical energy supplied to the first device section is switchable.

7. The system according to claim 1, wherein the first device section of the field devices comprises an inrush current limiter, which is configured to limit an inrush current at a start of the electrical energy supply.

8. The system according to claim 7, wherein the first device section of the field devices comprises a decoupling device configured to provide a predetermined input impedance for detecting the spark generation, and wherein the inrush current limiter of the field devices is arranged between the decoupling device and the power limiting device.

9. The system according to claim 1, wherein the field devices comprise a galvanic isolation so that the electrical energy supplied to the first device section is conducted on separate electrical circuits.

10. The system according to claim 1, wherein a galvanic isolation is formed in the first device section and/or in the electrical energy supply connection of the first and second device sections.

11. The system according to claim 1,
wherein the input terminal of the first device section of the field devices and, if present, at least one output terminal of the first device section of at least one field device is configured according to a first type of ignition protection,
wherein the at least one output line terminal of the second device section of the field devices is configured according to a second type of ignition protection, and
wherein the second type of ignition protection corresponds to a higher level of protection than the first type of ignition protection.

12. The system according to claim 1,
wherein the field devices are configured to carry out data communication, in that the first device section comprises at least one communication terminal for connecting a data line for receiving and/or transmitting data signals and a communication controller connected to the at least one communication terminal,
wherein the communication controller is connected to the terminal device of the second device section via a communication connection for receiving and/or transmitting data signals via the terminal device, and
wherein the communication connection of the communication controller and of the terminal device comprises a barrier device which is configured to cause a limitation of an electrical power transmittable from the communication controller to the terminal device during data communication and/or a galvanic isolation.

13. The system according to claim 12, wherein the terminal device of the field devices comprises an input/output controller configured to control at least one of the following:
receiving and/or transmitting data signals via the terminal device; and
forwarding electrical energy via the terminal device.

14. The system according to claim 12,
wherein the field devices are configured to carry out data communication via the at least one communication terminal of the first device section according to a first communication protocol, and
wherein the field devices are configured to carry out data communication via the terminal device of the second device section according to a second communication protocol different from the first communication protocol.

15. The system according to claim 12, wherein at least one of the following is arranged between the communication controller and the at least one communication terminal of the first device section of the field devices:
a physical interface; and a barrier circuit configured to cause a limitation of an electrical power transmittable to the communication terminal of the first device section during data communication and/or a galvanic isolation.

16. The system according to claim 12, wherein the input terminal of the field devices is configured as a hybrid terminal comprising the at least one communication terminal, to which a supply line configured as a hybrid line is connectible.

17. The system according to claim 12,
wherein the first device section of at least one field device comprises at least one output terminal for connecting a further supply line to forward the electrical energy supplied to the first device section, and
wherein the at least one output terminal of the at least one field device is configured as a further hybrid terminal comprising a communication terminal, to which the further supply line configured as a hybrid line is connectible.

18. The system according to claim 1,
wherein the feed-in device is configured to perform data communication,
and/or
wherein the feed-in device is connected to one of the field devices via a supply line, and wherein the field devices are connected to one another via further supply lines connecting two field devices in each case.

19. A system comprising:
a feed-in device, and
a plurality of field devices electrically connected to the feed-in device;
wherein the feed-in device is configured to provide an electrical energy for electrical energy supply to the field devices,
wherein the feed-in device comprises a monitoring device which is configured to detect spark generation in the electrical energy supply and, based on this, to switch off the electrical energy supply,
wherein the field devices each comprise a first device section having an input terminal for connecting a supply line, and a second device section,
wherein the electrical energy provided by the feed-in device is supplied to the first device section via the input terminal and transmittable from the first device section to the second device section via an electrical energy supply connection,
wherein the second device section comprises a terminal device having at least one output line terminal for connecting at least one output line to forward the electrical energy transmitted to the second device section,
wherein the electrical energy supply connection of the first and second device sections comprises a power limiting device configured to cause a limitation of an electrical power transmittable from the first device section to the second device section in the course of the energy transmission,
wherein the first device section comprises a decoupling device configured to provide a predetermined input impedance for detecting the spark generation,
wherein the first device section comprises an inrush current limiter configured to limit an inrush current at a start of the electrical energy supply, and
wherein the inrush current limiter is arranged between the decoupling device and the power limiting device.

20. A system comprising:
a feed-in device, and a plurality of field devices electrically connected to the feed-in device;

wherein the feed-in device is configured to provide an electrical energy for electrical energy supply to the field devices, wherein the feed-in device comprises a monitoring device which is configured to detect spark generation in the electrical energy supply and, based on this, to switch off the electrical energy supply, wherein the field devices each comprise a first device section having an input terminal for connecting a supply line, and a second device section, wherein the electrical energy provided by the feed-in device is supplied to the first device section via the input terminal and transmittable from the first device section to the second device section via an electrical energy supply connection, wherein the second device section comprises a terminal device having at least one output line terminal for connecting at least one output line to forward the electrical energy transmitted to the second device section, wherein the electrical energy supply connection of the first and second device sections comprises a power limiting device configured to cause a limitation of an electrical power transmittable from the first device section to the second device section in the course of the energy transmission, wherein the first device section of at least one field device comprises at least one output terminal for connecting a further supply line to forward the electrical energy supplied to the first device section to a further field device, and wherein the first device section of the at least one field device comprises a switching device arranged between the input terminal and the at least one output terminal, with the aid of which the forwarding of the electrical energy supplied to the first device section to the further field device is switchable.

* * * * *